United States Patent
Takano

(10) Patent No.: US 11,863,283 B2
(45) Date of Patent: Jan. 2, 2024

(54) COMMUNICATION DEVICE, BASE STATION DEVICE, COMMUNICATION METHOD, AND BASE STATION DEVICE CONTROL METHOD

(71) Applicant: Sony Group Corporation, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 131 days.

(21) Appl. No.: 17/437,842

(22) PCT Filed: Mar. 19, 2020

(86) PCT No.: PCT/JP2020/012334
§ 371 (c)(1),
(2) Date: Sep. 10, 2021

(87) PCT Pub. No.: WO2020/196280
PCT Pub. Date: Oct. 1, 2020

(65) Prior Publication Data
US 2022/0166489 A1  May 26, 2022

(30) Foreign Application Priority Data
Mar. 28, 2019 (JP) .................................. 2019-065152

(51) Int. Cl.
*H04B 7/08* (2006.01)
*H04W 8/22* (2009.01)
(Continued)

(52) U.S. Cl.
CPC ........... *H04B 7/088* (2013.01); *H04B 7/0874* (2013.01); *H04W 8/22* (2013.01); *H04W 16/28* (2013.01); *H04W 48/16* (2013.01)

(58) Field of Classification Search
CPC .... H04B 7/088; H04B 7/0874; H04B 7/0404; H04B 7/0695; H04W 8/22; H04W 16/28; H04W 48/16; H04W 48/20; H04W 8/24
See application file for complete search history.

(56) References Cited

U.S. PATENT DOCUMENTS

2018/0227026 A1   8/2018   Kim
2019/0090212 A1   3/2019   Chou
(Continued)

FOREIGN PATENT DOCUMENTS

CN   108288991 A   7/2018
JP   2019-4277 A   1/2019
(Continued)

OTHER PUBLICATIONS

International Search Report and Written Opinion dated Jun. 16, 2020, received for PCT Application PCT/JP2020/012334, Filed on Mar. 19, 2020, 8 pages including English Translation.
(Continued)

*Primary Examiner* — Kenneth T Lam
(74) *Attorney, Agent, or Firm* — XSENSUS LLP

(57) ABSTRACT

A communication device (200) includes an acquisition unit (242) and a reception unit (243). The acquisition unit (242) acquires similarity information indicating the similarity of the beam characteristics of the transmitting antenna panel in a plurality of signal groups transmitted from a base station (100). The reception unit (243) selects and receives a signal group to be received, from among the plurality of signal groups, based on the similarity information acquired by the acquisition unit (242).

8 Claims, 17 Drawing Sheets

(51) Int. Cl.
*H04W 16/28* (2009.01)
*H04W 48/16* (2009.01)

(56) References Cited

U.S. PATENT DOCUMENTS

| | | | |
|---|---|---|---|
| 2019/0159136 A1* | 5/2019 | MolavianJazi | H04W 52/362 |
| 2019/0253949 A1* | 8/2019 | Park | H04B 7/0695 |
| 2021/0176797 A1* | 6/2021 | Kang | H04W 74/008 |
| 2022/0039122 A1* | 2/2022 | Park | H04W 72/1268 |
| 2022/0116965 A1* | 4/2022 | Park | H04L 5/005 |
| 2022/0116979 A1* | 4/2022 | Park | H04L 5/0044 |

FOREIGN PATENT DOCUMENTS

| | | |
|---|---|---|
| WO | WO-2018017163 A1 | 1/2018 |
| WO | WO-2018231141 A1 | 12/2018 |
| WO | WO-2019004756 A1 | 1/2019 |

OTHER PUBLICATIONS

3GPP, "Physical Layer Procedures for Data", ETSI TS 138 214 V15.2.0, Jul. 2018, pp. 1-94.
Qualcomm Incorporated, "Beam Correspondence for NR", 3GPP TSG-RAN WG4 RAN4#1-NR, R4-1700190, Jan. 17-19, 2016, pp. 1-2.
Lenovo, et al., "Discussion of multi-beam operation", 3GPP TSG RAN WG1 Ad-Hoc Meeting 1901, R1-1900387, Jan. 11, 2019, pp. 1-6.
Vivo, "Further discussion on Multi-Beam Operation", 3GPP TSG RAN WG1 Meeting #96, R1-1901703, Feb. 16, 2019, pp. 1-7.
Mitsubishi Electric, "Views on multi-panel/TRP MIMO transmission", 3GPPtsg_ran\wg1_rl1, Sep. 28, 2018, "R1-1811483-RAN194b_multipanel_A", pp. 1-5.

* cited by examiner

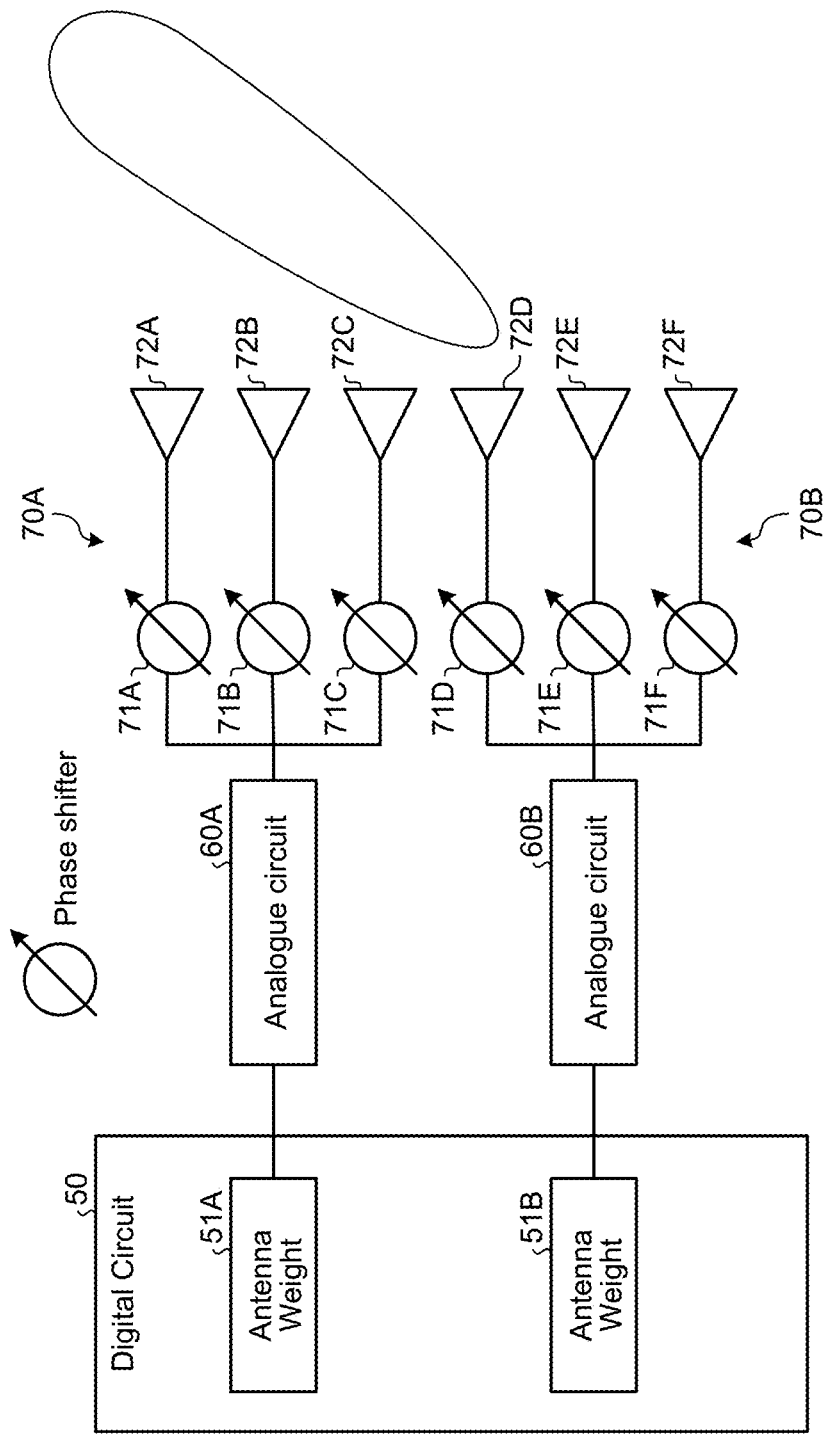

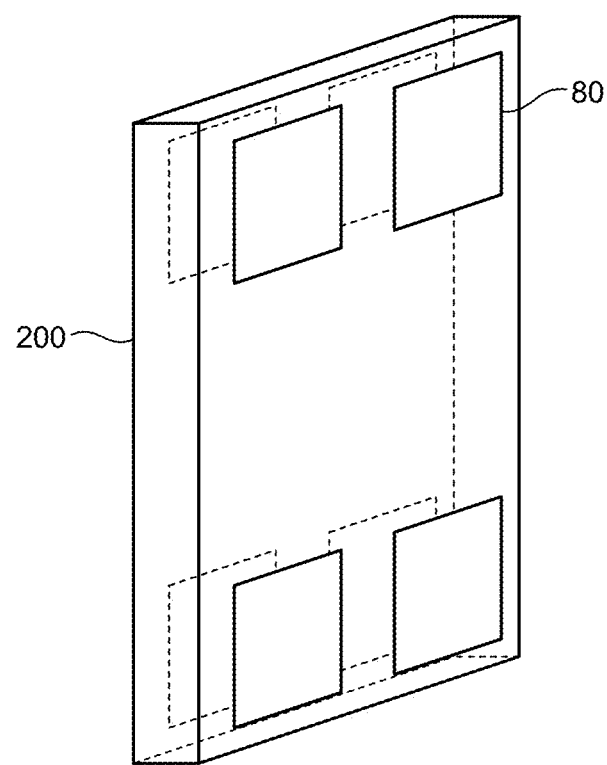

FIG.8
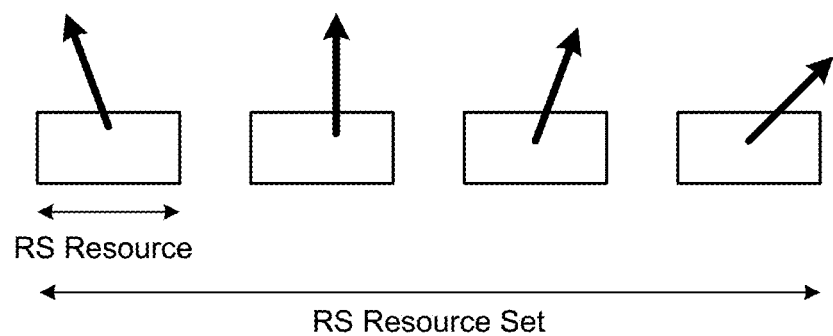
RS Resource
RS Resource Set
FIG.9
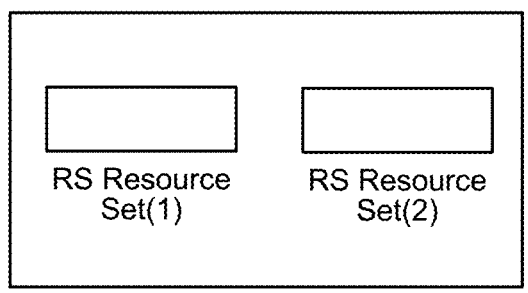
Antenna Panel (1)
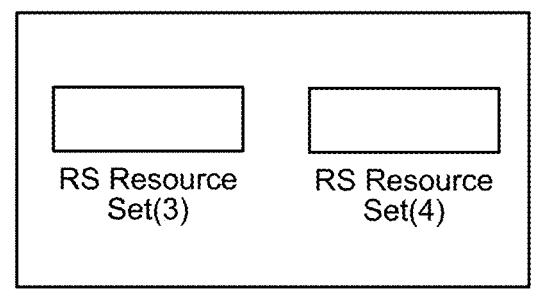
Antenna Panel (2)

COMMUNICATION DEVICE, BASE STATION DEVICE, COMMUNICATION METHOD, AND BASE STATION DEVICE CONTROL METHOD

CROSS-REFERENCE TO RELATED APPLICATIONS

The present application is based on PCT filing PCT/JP2020/012334, filed Mar. 19, 2020, which claims priority to JP 2019-065152, filed Mar. 28, 2019, the entire contents of each are incorporated herein by reference.

FIELD

The present disclosure relates to a communication device, a base station device, a communication method, and a base station device control method.

BACKGROUND

Various radio access methods and radio networks in cellular mobile communications (hereinafter, also referred to as "Long Term Evolution (LTE)", "LTE-Advanced (LTE-A)", "LTE-Advanced Pro (LTE-A Pro)", "Fifth generation (5G)", "New Radio (NR)", "New Radio Access Technology (NRAT)", "Evolved Universal Terrestrial Radio Access (EUTRA)", or "Further EUTRA (FEUTRA)") are under examination in 3rd Generation Partnership Project (3GPP). In the following description, LTE includes LTE-A, LTE-A Pro, and EUTRA, and NR includes NRAT and FEUTRA. In LTE and NR, a base station device (base station) is also referred to as an evolved Node B (eNodeB) in LTE and referred to as gNodeB in NR, while a terminal device (mobile station, mobile station device, or terminal) is also referred to as User Equipment (UE). LTE and NR are cellular communication systems that arrange a plurality of areas covered by the base station, as cellular areas. A single base station may manage a plurality of cells.

CITATION LIST

Non Patent Literature

Non Patent Literature 1: "3GPP TS 38.214 version 15.2.0 Release 15", [online], [Searched on Mar. 26, 2019], Internet (https://www.etsi.org/deliver/etsi_ts/138200-138299/138214/15.02.00_60/ts_138214v150200p.pdf)

SUMMARY

Technical Problem

When transmitting a reference signal to a terminal, the base station collectively transmits a plurality of reference signals as a signal group in some cases. Furthermore, when a plurality of antenna panels facing the same direction each transmits a signal group on the base station side, this sometimes leads to a result on the terminal side that a same receiving antenna panel is used for receiving mutually different signal groups. In this case, the plurality of signals transmitted by the plurality of antenna panels facing the same direction might have quasi-co-located (at least partially identical or similar) characteristics on the receiving side. With the plurality of signals having quasi-co-located (at least partially identical or similar) characteristics on the receiving side, results of predetermined processes performed on the plurality of signals might be the same. Nevertheless, in the prior technology, the base station has transmitted the signal group and the terminal has received the signal group without considering the arrangement of the antenna panels on the base station side, leading to a concern of occurrence of unnecessary signal processing on the terminal side.

In view of this, the present disclosure proposes a communication device, a base station device, a communication method, and a base station device control method capable of reducing unnecessary signal processing.

Solution to Problem

A communication device includes an acquisition unit and a reception unit. The acquisition unit acquires similarity information indicating the similarity of the beam characteristics of the transmitting antenna panel in a plurality of signal groups transmitted from a base station. The reception unit selects and receives a signal group to be received, from among the plurality of signal groups, based on the similarity information acquired by the acquisition unit.

BRIEF DESCRIPTION OF DRAWINGS

FIG. 6A is a diagram illustrating an example of an analogue-digital hybrid antenna architecture.

FIG. 6B is a diagram illustrating an example of arranging eight antenna panels in a terminal device.

FIG. 8 is a diagram related to reference signal resource sets.

FIG. 9 is a diagram related to reference signal resource sets.

DESCRIPTION OF EMBODIMENTS

Figure 1:
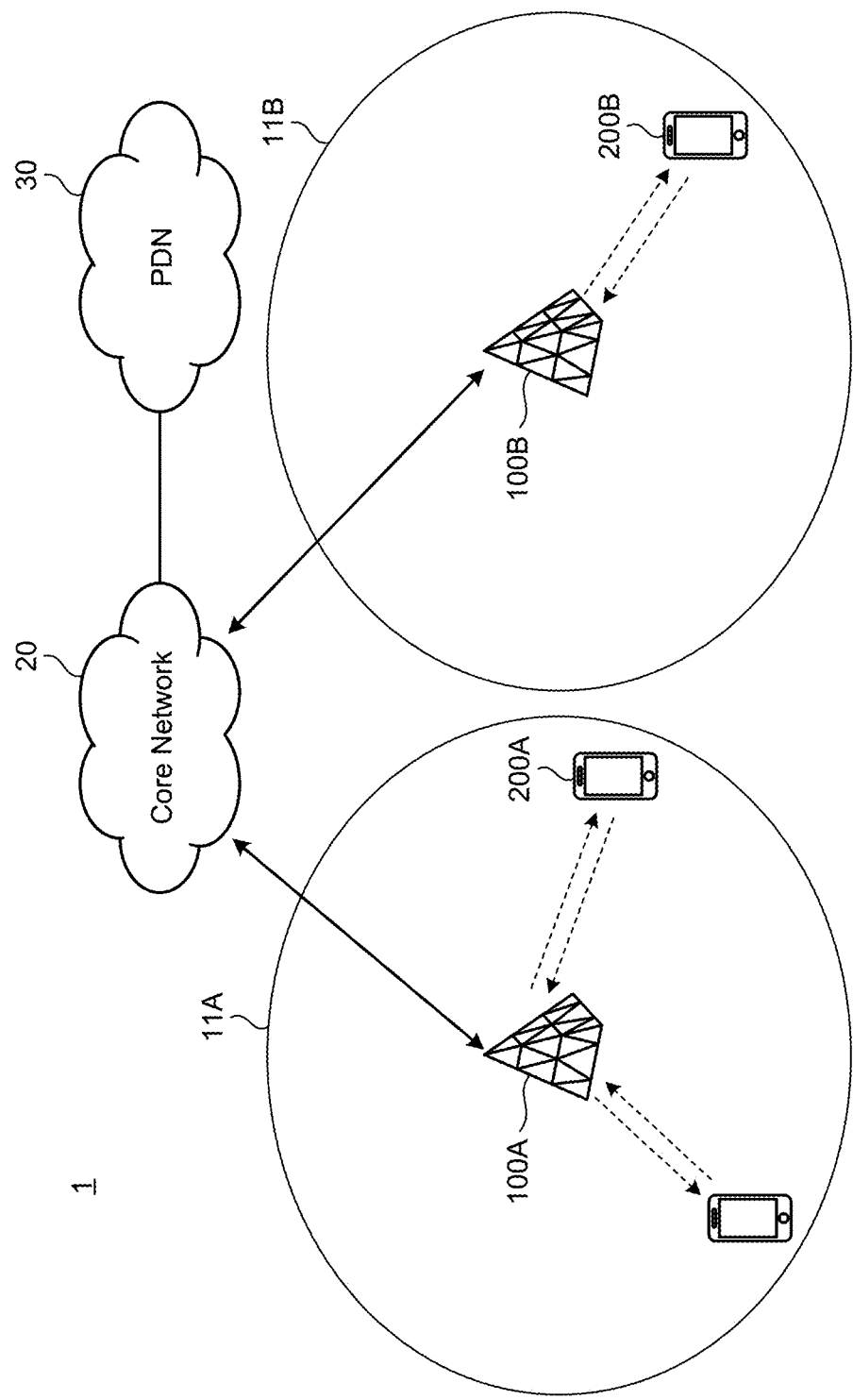
FIG. 1 is a diagram illustrating an example of an entire configuration of a communication system according to an embodiment of the present disclosure.

Embodiments of the present disclosure will be described below in detail with reference to the drawings. In each of the following embodiments, the same parts are denoted by the same reference numerals, and a repetitive description thereof will be omitted.

Moreover, in the present specification and the drawings, a plurality of components having substantially the same functional configuration will be distinguished by attaching different numbers after the same reference numerals. However, when it is not particularly necessary to distinguish between the plurality of components having substantially the same functional configuration, only the same reference numeral is given.

The present disclosure will be described in the following order.

1. Introduction
1.1. System configuration
1.2. Related technologies
1.3. Outline of proposed technology
2. Configuration examples
2.1. Configuration example of base station
2.2. Configuration example of terminal device
3. Embodiments
4. Application examples
4.1. Application examples related to base station
4.2. Application examples related to terminal devices
5. Modifications
6. Summary 1. Introduction 1.1. System Configuration FIG. 1 is a diagram illustrating an example of an entire configuration of a communication system 1 according to an embodiment of the present disclosure. As illustrated in FIG. 1, the communication system 1 includes base stations 100 (100A and 100B), terminal devices 200 (200A and 200B), a core network 20, and a packet data network (PDN) (or simply referred to as data network (DN)) 30.

The base station 100 is a base station device installed in a base station, which is a communication device that manages cells 11 (11A and 11B) and provides radio services to one or more terminal devices located inside the cell 11. For example, the base station 100A provides a radio service to the terminal device 200A, while the base station 100B provides a radio service to the terminal device 200B. The cell 11 can be managed according to a certain radio communication system such as LTE or New Radio (NR). The base station 100 may be any of eNodeB, ng-eNodeB, gNodeB, or en-gNodeB. In addition to or instead of this, the base station 100 may be referred to as EUTRAN when the base station 100 is either eNodeB or en-gNodeB. In addition to or instead of this, the base station 100 may be referred to as NGRAN when the base station 100 is either gNodeB or ng-eNodeB. The base station 100 is connected to the core network 20. The core network 20 is connected to the PDN 30.

When working as an EPC in LTE, for example, the core network 20 can include Mobility Management Entity (MME), Serving gateway (S-GW), PDN gateway (P-GW), Policy and Charging Rule Function (PCRF), and Home Subscriber Server (HSS). The MME is a control node that handles control plane signals and manages the moving state of the terminal device. The S-GW is a control node that handles user plane signals and is implemented as a gateway device that switches user information transfer routing. The P-GW is a control node that handles user plane signals and implemented as a gateway device that makes a connection point between the core network 20 and the PDN 30. The PCRF is a control node that controls policies such as Quality of Service (QoS) for bearers and billing. The HSS is a control node that handles subscriber data and controls services. Meanwhile, when working as a 5GC in NR, the core network 20 can include Access and mobility Management Function (AMF), Session Management Function (SMF), User-Plane Function (UPF), Policy Control Function (PCF), and Unified Data Management (UDM). The AMF is a control node that handles control plane signals and manages the moving state of the terminal device. The SMF is a control node that handles control plane signals and manages data transfer routing. The UPF is a control node that handles user plane signals and manages user information transfer routing. The PCF is a control node that controls policies. The UDM is a control node that handles subscriber data.

The terminal device 200 is a communication device that performs radio communication with the base station 100 under the control of the base station 100. The terminal device 200 may be a terminal referred to as User Equipment (UE). For example, the terminal device 200 transmits an uplink signal to the base station 100 and receives a downlink signal from the base station 100.

1.2. Related Technologies (1) Bandwidth Part (BWP)

Figure 2:
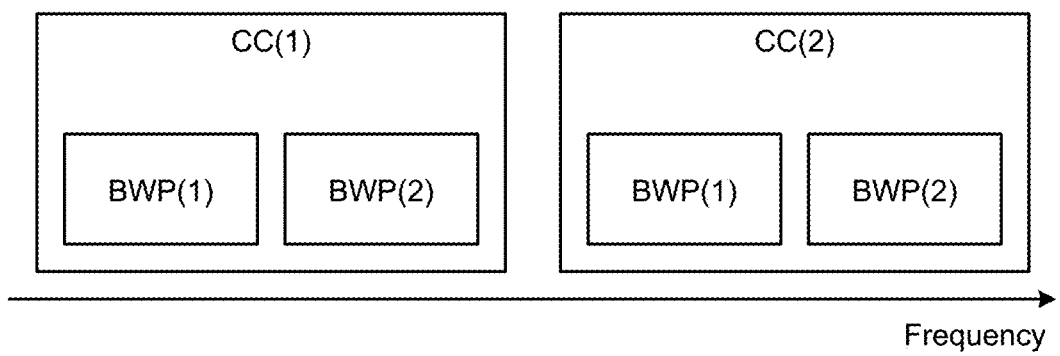
FIG. 2 is a diagram illustrating BWP.

FIG. 2 is a diagram illustrating a BWP. In the example of FIG. 2, Component Carrier (CC) #1 contains a plurality of BWPs (#1 and #2), and CC #2 contains a plurality of BWPs (#1 and #2). In the present specification, the number following the mark # represents an index (or an identifier). The BWPs contained in different CCs represent different BWPs even with an identical index. The BWP is obtained by dividing the CC, which is one operation band width, into a plurality of frequency bandwidths. In each of the BWPs, different Subcarrier spacings (e.g. Numerology) can be set. Note that one CC may include a Downlink Component Carrier and an Uplink Component Carrier, or may be either a Downlink Component Carrier or an Uplink Component Carrier. Moreover, one CC may correspond to one cell. That is, a plurality of BWPs may be included in one cell.

This BWP has been standardized in the NR feature of 3GPP Rel15. The BWP can also be defined as a subset of the total cell bandwidth regarding one cell. In the Orthogonal Frequency Division Multiplexing (OFDM) modulation method standardized on LTE in Rel8, the subcarrier spacing is fixed at 15 kHz. By contrast, in the NR feature of Rel15, the subcarrier spacing can be set to 15 kHz, 30 kHz, 60 kHz, 120 kHz, or 240 kHz. The longer the subcarrier spacing, the shorter the OFDM symbol length. For example, the subcarrier spacing is 15 kHz in LTE, which has enabled transmission of two slots per 1 ms (millisecond) (i.e. 1 subframe), in other words, enabling transmission of 14 OFDM symbols. By contrast, in NR, the subcarrier spacing of 60 kHz enables transmission of four slots per 1 ms, while the subcarrier spacing of 120 kHz enables transmission of eight slots per 1 ms, and subcarrier spacing of 240 kHz enables transmission of 16 slots per 1 ms. In this manner, extending the subcarrier would shorten the OFDM symbol length. This makes it possible to provide a frame configuration suitable for low-latency communication.

The NR makes it possible to set the BWPs with different subcarrier spacing settings to the terminal at the same time. Accordingly, the NR can provide a plurality of BWPs for different use cases at the same time.

(2) Number of Active BWPs

The BWP that can be used for transmission and reception is also referred to as an active BWP. In 3GPP, the active BWP is also defined as a UE operating bandwidth within a cell operating bandwidth. The number of BWPs that the base station 100 can transmit and receive at the same time is also referred to as the number of active BWPs. The number of active BWPs of the base station 100 may be plural. In contrast, the number of active BWPs of the terminal device 200 is one in the case of the UE of 3GPP Rel. 15. However, in the present specification, the number of active BWPs of the terminal device 200 may be plural. In the technique according to the present disclosure, the number of active BWPs of the terminal device 200 is assumed to be one.

(3) Relationship Between Cell (or CC), Carrier, and BWP

In the present disclosure, a plurality of cells may be allowed to overlap each other in the frequency direction in one carrier. For example, a plurality of Synchronization Signal/PBCH blocks (SSBs) may be transmitted at a plurality of frequency spans in one carrier. However, from the viewpoint of UE (that is, the terminal device 200), each of cells (serving cells) is associated with at most one SSB (that is, a Cell-defining SSB). The UE (terminal device 200) uses the BWP associated with the Cell-defining SSB as an Initial BWP. Furthermore, the UE (terminal device 200) may use a Dedicated BWP constituted with one or more frequency spans in the same carrier as the Initial BWP, in addition to the Initial BWP. From a UE (terminal device 200) perspective, the Initial BWP and the additional Dedicated BWP are associated with one cell. The present embodiment may include a case where the terminal device 200 uses a plurality of BWPs at the same time point.

(4) Codebook Based Beamforming

With beamforming performed in communicating with the terminal device 200, the base station 100 can improve the communication quality, for example. Beamforming methods include a method of generating a beam that tracks the terminal device 200 and a method of selecting a beam that tracks the terminal device 200 from among candidate beams. The former method might not be adopted in cellular radio communication systems (for example, 5G) because of the computational cost of generating a beam each time. By contrast, the latter method is adopted in Full Dimension Multiple Input Multiple Output (FD-MIMO) in Release 13 of Third Generation Partnership Project (3GPP). The latter method is also referred to as codebook based beamforming.

In the codebook based beamforming, the base station 100 prepares (that is, generates) beams in all directions in advance, and selects the beam suitable for the target terminal device 200 from among the prepared beams so as to communicate with the terminal device 200 using the selected beam. For example, when capable of communicating in 360 degrees in the horizontal direction, for example, the base station 100 prepares 360 types of beams in increments of 1 degree. When allowing the beams to be half overlapped with each other, the base station 100 prepares 720 types of beams. In the vertical direction, the base station 100 prepares a beam for 180 degrees ranging from −90 degrees to +90 degrees, for example.

The terminal device 200 only monitors the beam, and thus, has no high need for grasping the existence of the codebook on the base station 100 side.

In the following, a plurality of beams prepared in advance by the base station 100 is also referred to as a beam group. The beam group can be defined for each of frequency bands, for example. The beam group can also be defined for each of Rx/Tx beams, or for each of downlinks/uplinks. The plurality of beams prepared or managed by the base station 100 may be associated with one cell (i.e. the plurality of beams may constitute one cell). Alternatively, the plurality of beams prepared or managed by the base station 100 may be associated with a plurality of cells (i.e. the plurality of beams may constitute a plurality of cells).

(5) Beam Sweeping

In the NR, in order to select the optimum beam to be used for communication, beam sweeping, which transmits or receives a measurement signal (known signal) by using each of a plurality of beams belonging to a beam group, has been examined. The measurement signal is also referred to as a reference signal in some cases. When the measurement signal is a downlink signal, the measurement signal may include Synchronization Signal block (SSB)/Physical Broadcast Channel (PBCH) block, or Channel State Information-Reference Signal (CSI-RS). Based on the measurement result of the measurement signal (i.e. measurement signal of each of beams) transmitted from the base station with beam sweeping, the terminal can select the optimum transmission-oriented beam (hereinafter, also referred to as a transmitting beam). An example of this will be described with reference to FIG. 3.

Figure 3:
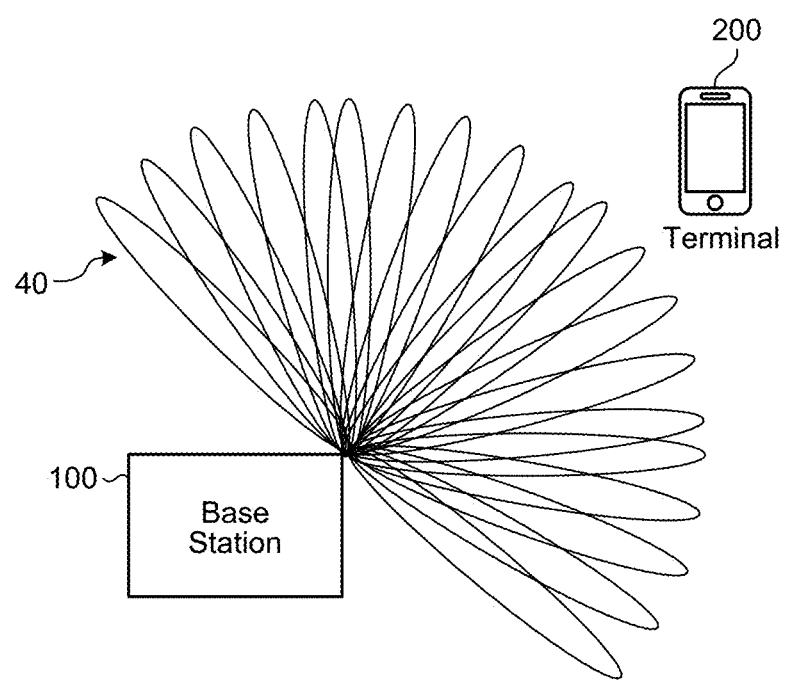
FIG. 3 is a diagram illustrating beam sweeping.

FIG. 3 is a diagram illustrating beam sweeping. In an example illustrated in FIG. 3, the base station 100 transmits a measurement signal with beam sweeping (that is, switching the transmitting beam) using the beam group 40. In addition, transmission with beam sweeping is also referred to as beam sweeping transmission below. Thereafter, the terminal device 200 measures the measurement signal obtained by beam sweeping transmission and determines which of the transmitting beams is most likely to be received (which is the best beam(s) for the terminal device 200). In this manner, the optimum transmitting beam of the base station 100 for the terminal device 200 is selected. By exchanging the base station 100 and the terminal device 200 and executing the similar procedure, the base station 100 can select the optimum transmitting beam of the terminal device 200.

On the other hand, the optimum reception-oriented beam (hereinafter, also referred to as a receiving beam, or a beam) can be selected based on the measurement result obtained by receiving the measurement signal with beam sweeping. For example, the terminal device 200 transmits a measurement signal by an uplink. Thereafter, the base station 100 receives the measurement signal with beam sweeping (that is, switching the receiving beams), and determines which of the receiving beams is most likely to be received. In this manner, the optimum receiving beam of the base station 100 is selected. By exchanging the base station 100 and the terminal device 200 and executing the similar procedure, the terminal device 200 can select the optimum receiving beam of the terminal device 200. In addition, reception with beam sweeping is also referred to as beam sweeping reception below.

The reception and measurement side of a measurement signal transmitted by beam sweeping transmission reports the measurement result to the transmitting side of the measurement signal. The measurement result may include information indicating which of the transmitting beams is optimal (e.g. beam identifier, time, preamble, or the like). The optimum transmitting beam is a transmitting beam having the highest reception power, for example. The measurement result may include information indicating one transmitting beam having the highest reception power, or may include information indicating the top K transmitting beams in order from the one having the highest reception power. The measurement result includes, for example, identification information of the transmitting beam (for example, the index of the beam) and information indicating the magnitude of the reception power of the transmitting beam (for example, Reference Signal Received Power (RSRP)) in association with each other.

The beam used in beam sweeping is transmitted by giving directivity to the reference signal which is a known signal. Therefore, the terminal device 200 can discriminate the beam by using a resource being a reference signal.

The base station 100 can provide one beam using the resource of one reference signal. That is, with preparation of ten resources, the base station 100 can perform beam sweeping corresponding to ten different directions. Ten resources can be collectively referred to as a resource set. One resource set formed with ten resources can provide beam sweeping corresponding to ten directions.

(6) CSI Acquisition Procedure

A Channel State Information (CSI) acquisition procedure is executed after the optimum beam selection performed by the beam selection procedure including the beam sweeping described above. The CSI acquisition procedure acquires the channel quality in communication using the selected beam. For example, the CSI acquisition procedure includes acquisition of a Channel Quality Indicator (CQI).

Channel quality is used to determine communication parameters such as modulation methods. Adoption of a modulation method capable of transmitting only a few bits even with good channel quality, for example, Quadrature Phase Shift Keying (QPSK), would cause a low throughput. On the other hand, adoption of a modulation method capable of transmitting a large amount of bits, such as 256 Quadrature Amplitude Modulation (QAM) even with poor channel quality would lead to a failure in data reception (i.e. decoding) on the receiving side, resulting in a low throughput as well. In this manner, proper acquisition of channel quality is important in order to improve the throughput.

Figure 4:
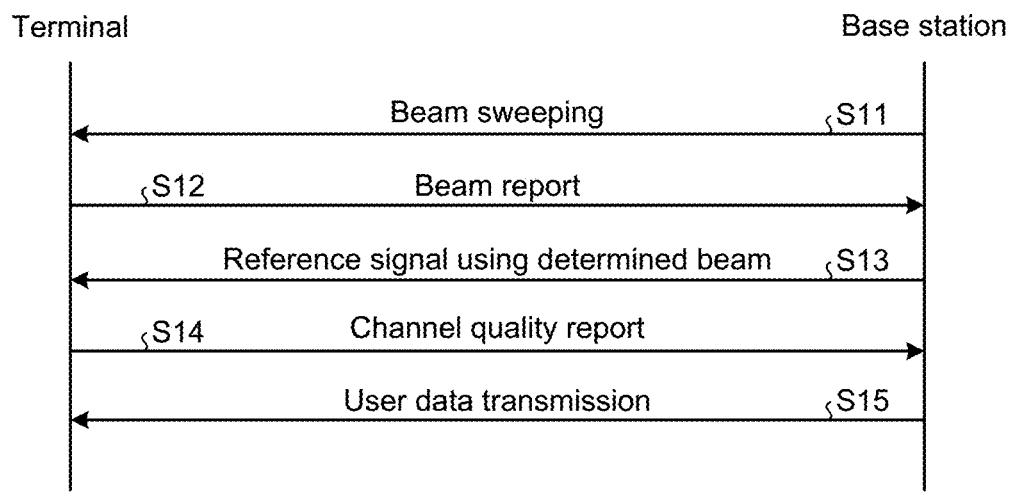
FIG. 4 is a sequence diagram illustrating an example of a flow of a typical beam selection procedure and CSI acquisition procedure executed by a base station and a terminal device.

FIG. 4 is a sequence diagram illustrating an example of a flow of a typical beam selection procedure and a CSI acquisition procedure executed by a base station and a terminal device. As illustrated in FIG. 4, the base station uses beam sweeping to transmit a measurement signal (e.g. SSB) for beam selection (step S11). Next, the terminal device measures the measurement signal for beam selection and reports a beam measurement result (beam report) to the base station (step S12). The measurement result includes, for example, information (e.g. index associated with the best beam) indicating the selection result of the optimum transmitting beam of the base station. The base station then transmits a measurement signal (e.g. CSI-RS) for channel quality acquisition using the selected optimum beam (step S13). Next, the terminal device reports the acquired channel quality to the base station based on the measurement result of the measurement signal (step S14). Thereafter, the base station transmits user information to the terminal device by using the communication parameters based on the reported channel quality (step S15). From the above, a beam report, which includes the measurement result of the measurement signal for beam selection received by the base station or the terminal, is transmitted to the terminal or the base station.

Downlink channel quality is measured based on the measurement signal transmitted over the downlink. Additionally, downlink channel quality can also be measured based on the measurement signal transmitted over the uplink. This is because the uplink channels and the downlink channels have reversibility, and have basically the same channel quality. Such reversibility is also referred to as channel reciprocity.

When measuring the downlink channel quality based on the downlink measurement signal, the measurement result of the measurement signal for channel quality acquisition is reported as illustrated in step S14 of FIG. 4. Reporting this measurement result can be a significant amount of overhead. A channel can be represented by an N×M matrix when the number of transmitting antennas is M and the number of receiving antennas is N. Each of elements of the matrix is a complex number corresponding to IQ. For example, in a case where each I/Q is represented by 10 bits, the number of transmitting antennas is 100, and the number of receiving antennas is eight, the report of the channel quality measurement result would use 8×100×2×10=16000 bits, which would be a significant amount of overhead.

In comparison, when measuring the downlink channel quality based on the uplink measurement signal, it is not necessary to report the measurement result because the measurement subject is the base station. Therefore, by measuring the downlink channel quality based on the uplink measurement signal, it is possible to reduce the overhead related to reporting the measurement result and improve the throughput. The flow of process in measuring the channel quality of the downlink based on the uplink measurement signal will be described with reference to FIG. 5.

Figure 5:
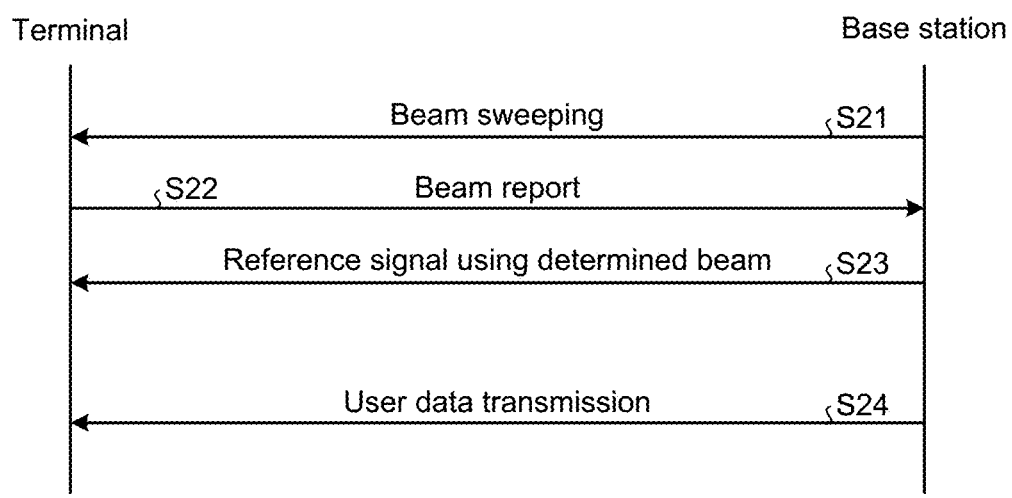
FIG. 5 is a sequence diagram illustrating another example of a flow of a typical beam selection procedure and CSI acquisition procedure executed by a base station and a terminal device.

FIG. 5 is a sequence diagram illustrating another example of a flow of a typical beam selection procedure and CSI acquisition procedure executed by a base station and a terminal device. As illustrated in FIG. 5, the terminal device transmits the measurement signal for beam selection by using beam sweeping transmission, and the base station receives the measurement signal by using beam sweeping (step S21). At that time, the base station selects the optimum transmitting beam of the terminal device and the optimum receiving beam of the base station based on the measurement result. Next, the base station reports the beam measurement result (beam report) to the terminal device (step S22). Such measurement result includes information indicating the selection result of the optimum transmitting beam of the terminal device. Next, the terminal device transmits a measurement signal for channel quality acquisition by using the selected transmitting beam (step S23). The base station acquires uplink channel quality based on the measurement result, and acquires downlink channel quality based on the uplink channel quality. Thereafter, the base station transmits user information to the terminal device using the communication parameters based on the acquired downlink channel quality (step S24). From the above, a beam report, which includes the measurement result of the measurement signal for beam selection received by the base station or the terminal, is transmitted to the terminal or the base station.

(7) Analogue-Digital Hybrid Antenna Architecture

In order to control the directivity of the antenna, there is an assumable architecture in which all processes are performed by an analogue circuit. Such an architecture is also referred to as a fully digital architecture. In a fully digital architecture, antenna weights as many as antennas (that is, antenna elements) are applied in a digital domain (that is, by a digital circuit) to control the directivity of the antenna. The antenna weight is a weight for controlling the amplitude and phase. Unfortunately, however, the fully digital architecture has a drawback of enlargement of the digital circuit. Examples of an architecture to overcome such a drawback of the fully digital architecture include an analogue-digital hybrid antenna architecture.

FIG. 6A is a diagram illustrating an example of an analogue-digital hybrid antenna architecture. The architecture illustrated in FIG. 6A includes a digital circuit 50, analogue circuits 60 (60A and 60B), and antenna panels 70 (70A and 70B). The digital circuit can apply a plurality of antenna weights 51 (51A and 51B). The analogue circuit 60 and the antenna panel 70 are provided in the same number as the number of antenna weights 51 applicable to the digital circuit 50. The antenna panel 70 includes a plurality of antennas 72 (72A to 72F) and phase shifters 71 (71A to 71F) as many as the number of antennas 72. The phase shifter 71 is a device that applies an antenna weight that can control the phase alone in an analogue domain.

The characteristics of the antenna weight in the digital domain and the antenna weight in the analogue domain are illustrated in Table 1 below.

TABLE 1

| | Analogue domain | Digital domain |
|---|---|---|
| Controllable target | Phase | Amplitude and phase |
| Analogue or digital | Analogue | Digital |
| Arrangement position: time domain or frequency domain | Time domain | Frequency domain when OFDM modulation method is use and when arrangement is performed on FFT/IFFT back/front on receiving side/transmitting side |
| Is it possible to provide different beams in different frequencies in same time | Impossible | Possible |
| Is it possible to provide different beams in same frequency in same time | Impossible | Possible |

Antenna weights in the digital domain are applied in a frequency domain when OFDM modulation method is used. For example, the antenna weight in the digital domain is applied before Inverse Fast Fourier Transform (IFFT) at the time of transmission and applied after Fast Fourier Transform (FFT) at the time of reception.

Antenna weights in the digital domain are applied in the frequency domain. Therefore, by applying the antenna weights in the digital domain, it is possible to transmit a beam in different directions using different frequency resources even when the time resources are the same. On the other hand, the antenna weights in the analogue domain are applied in a time domain. Therefore, even when the antenna weight in the analogue domain is applied, the beam can be directed only in the same direction over all frequency resources with the same time resource.

That is, each of the antenna panels 70 can transmit a beam in different directions using different frequency resources even with the same time resource. On the other hand, one antenna panel 70 can direct the beam in only one direction using the same time resource and frequency resource. Therefore, in the analogue-digital hybrid antenna architecture, the number of directions of the beam that can be transmitted and received in the same time resource corresponds to the number of antenna panels 70. Furthermore, in the analogue-digital hybrid antenna architecture, the number of beam groups that be handled by beam sweeping transmission or beam sweeping reception in the same time resource corresponds to the number of antenna panels 70.

Such an analogue-digital hybrid antenna architecture can be adopted in both the base station 100 and the terminal device 200.

(8) Antenna Panel

In FIG. 6A, three analogue domain phase shifters are connected to one digital domain weight. The one digital domain weight and the three analogue domain phase shifters can be arranged as a set as an antenna panel. FIG. 6A illustrates an example in which two antenna panels are provided, each of the antenna panels being formed with three antenna elements. As illustrated in Table 1, usually it would not possible, with one panel, to form beams in different directions at the same time using different frequencies. However, it is possible, with two panels, to form beams in different directions, even at the same time. This antenna panel configuration is used on both the base station side and the terminal side.

FIG. 6B is a diagram illustrating an example of arranging eight antenna panels in the terminal device 200. FIG. 6B illustrates an example of arranging a total of eight antenna panels, specifically four on front surface and four on back surface of the terminal device 200. The number of antenna elements mounted on one antenna panel is not limited to a specific number. Still, four antenna elements are mounted on one antenna panel, for example. Since the four antenna panels arranged on the front surface, or the four antenna panels arranged on the back surface, are arranged so as to face the same direction, the panels here are referred to as coherent antenna panels. In contrast, the antenna panels on the front surface and the antenna panels on the back surface are referred to as non-coherent antenna panels.

(9) Reference Signal and User Information Resource

In order to implement beam sweeping and the CSI acquisition procedure, it is necessary to transmit and receive the reference signal between the base station device 100 and the terminal device 200. Furthermore, when the user information is transmitted and received between the base station device 100 and the terminal device 200, it is also necessary to transmit and receive the reference signal. These reference signals are basically designated by frequency and time resources, and include some cases where resources are designated by using orthogonal sequences. In contrast, as for the user information, scheduling information included in the control signal designates the frequency and time resources of the user information. In the case of user information, orthogonal sequences are not to be assigned as resources. Only frequency and time resources are designated.

(10) Selecting Antenna Panel and Beam on the Receiving Side (10-1) Selecting Antenna Panel and Beam at Beam Management Stage During beam management, with trial-and-error (e.g. trial on each combination of the beam and the antenna panel one by one) on the terminal device 200 side on the beam coming from the base station 100, determination is made as to which beam and which antenna panel are to be used for reception. Basically, different antenna panels can operate at the same time. Therefore, when four resource areas in a resource block are set as reference signal resources for the same beam for a downlink beam, the terminal device 200 can use four different receiving beams for each of antenna panels to determine which is the desired receiving beam for the terminal device 200. Such an operation is performed for the number of downlink beams corresponding to different directions on the base station 100 side. When the number of downlink beams is ten, the terminal device 200 monitors the receiving beam using 10×4=40 resources, thereby enabling determination of the desired beam from the base station 100 as well as the antenna panel and the desired beam on the terminal device 200 side. In the present specification, for convenience of explanation, the combination of the receiving antenna panel and the receiving beam used by the terminal for reception is also referred to as a reception environment.

(10-2) Selecting Antenna Panel and Beam at CSI Procedure Stage

The CSI procedure stage is the stage where the base station 100 uses precoding for transmission (finer antenna control) and then confirms the quality of the channel in more detail. At the CSI procedure stage, the reference signal (CSI-RS) for the CSI procedure is received by using the antenna panel of the terminal device 200 identified in the previous beam management stage and using the beam determined to be the most desirable within the antenna panels.

(10-3) Selection of Antenna Panel and Beam at User Information Reception Stage

At the user information reception stage, the terminal device 200 may only be required to receive user information using the antenna panel and the receiving beam determined at the time of beam management, similarly to the CSI procedure stage. However, when there are two beams using such an antenna panel, the terminal device 200 cannot determine how to select the antenna panel and the beam.

Figure 7:
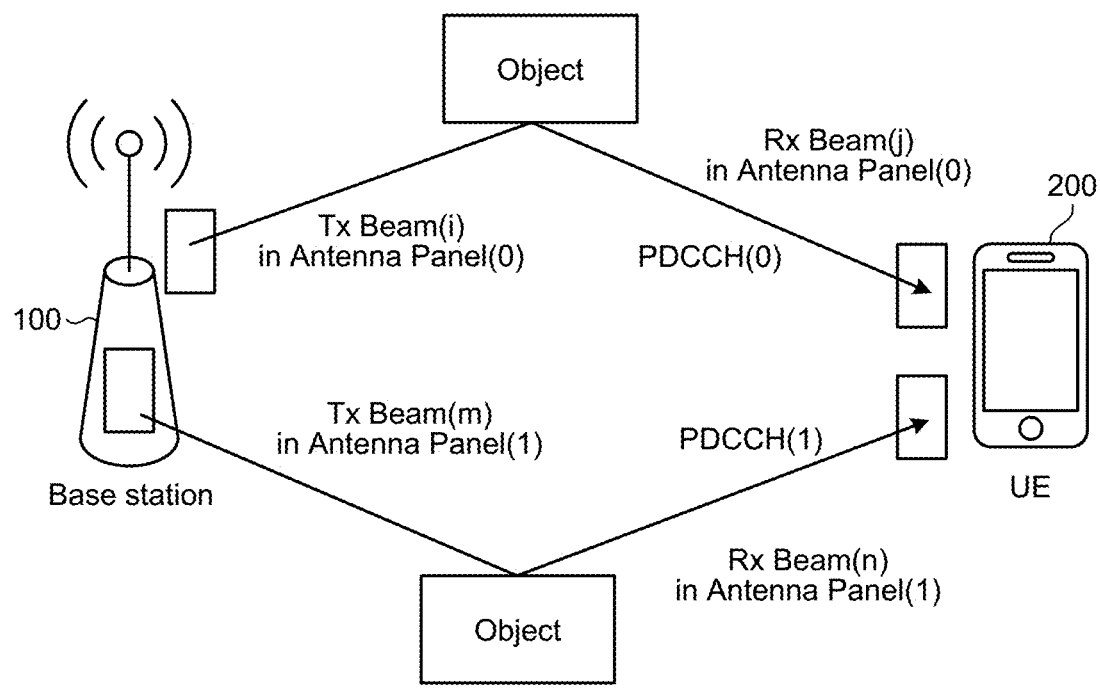
FIG. 7 is a diagram illustrating two beam sets.

FIG. 7 is a diagram illustrating two beam sets. When the terminal device 200 has performed the beam management process twice and has determined the antenna panel and the beam of the terminal device 200 suitable for each of the beams transmitted from the two different antenna panels of the base station 100, there are two beam sets as illustrated in FIG. 7. Specifically, the two beams sets include a first beam set "Beam set (0): transmitting beam (i) in transmitting antenna panel (0)+receiving beam (j) in receiving antenna panel (0)", and a second beam set "Beam set (1): transmitting beam (m) in transmitting antenna panel (1)+receiving beam (n) in receiving antenna panel (1)". The beam set refers to a beam link constituted with a combination of antenna panels and beams on the transmitting side and the receiving side.

Furthermore, since control information (e.g. scheduling information), which is a control signal that designates a resource of user information, is transmitted using a beam, it is important to grasp which beam set is to be used to receive the control information by the terminal device 200. Examples of the control information include PHY Downlink Control Channel (PDCCH) or Downlink Control Information (DCI) transmitted by the PDCCH.

(10-4) Method of Designating Antenna Panel and Beam Used by Terminal

In FIG. 7, the base station 100 may explicitly or implicitly indicate to the terminal device 200 that reception of the PDCCH (0) is enabled by the receiving beam (j) of the receiving antenna panel (0). A conceivable example of this would be a method of directly designating the receiving antenna panel and the receiving beam of the terminal device 200.

On the other hand, for example, there is an assumable case where the base station 100 has transmitted "Reference Signal A" using the "transmitting beam (i) in the transmitting antenna panel (0)", and the terminal device 200 has received the "Reference Signal A" by using the "receiving beam (j) in the receiving antenna panel (0)". Furthermore, there is an assumable case where the base station 100 has transmitted "Reference Signal B" using the "transmitting beam (m) in the transmitting antenna panel (1)", and the terminal device 200 has received the "Reference Signal B" by using the "receiving beam (n) in the receiving antenna panel (1)". Based on this, before transmission of PDCCH (0), the base station 100 can instruct to use, at the time of receiving the PDCCH (0), the receiving antenna panel and the receiving beam used when receiving "Reference Signal A". In other words, it is possible to implicitly designate an instruction equivalent to the instruction to use the receiving beam (j) in the receiving antenna panel (0).

(10-5) Process with No Designation of Antenna Panel and Beam

In the above, the base station 100 clearly instructed the terminal device 200 to use the same receiving antenna panel and receiving beam as when receiving "Reference Signal A". However, there are cases where there is no instruction from the base station 100 or the setting of the instruction by the base station 100 is not in time, which leads to the necessity of performing a process for such a case. For example, it is conceivable to use the receiving antenna panel and the receiving beam used when the terminal device 200 synchronizes with the base station 100 as a default.

However, when synchronization signals (reference signals) are provided from different antenna panels of the base station 100, it is difficult to determine which antenna panel and beam used in reception of which synchronization signal should be used as the default.

(10-6) Synchronization Signal

Here, a synchronization signal will be described. The synchronization signal is a signal that periodically transmits an SSB burst. The SSB burst includes a plurality of SSBs that has undergone beamforming. The SSB contains a sequence of synchronization signals PSS and SSS and system information referred to as PBCH for broadcast. PSS and SSS are supposed to be used in the same manner as LTE. The base station 100 transmits each of SSBs using beams in different directions. Accordingly, the terminal device 200 receives the SSB facing the direction of the terminal device 200 and performs synchronization.

Furthermore, the base station 100 transmits the SSB contained in the SSB burst by using a different transmitting antenna panel for each of the SSB bursts. The terminal device 200 can synchronize with the SSB transmitted from the plurality of transmitting antenna panels, and at the same time, can grasp one or more optimum receiving antenna panels and receiving beams required when receiving the SSBs from the plurality of transmitting antenna panels. In this case, for example, as illustrated in FIG. 7, the terminal device 200 will grasp two sets of the receiving antenna panel and the receiving beam.

In this manner, in a case where the receiving antenna panel and receiving beam settings required for receiving control signals and user information are not in time with a plurality of optimum receiving antenna panels and receiving beam sets for receiving synchronization signals, the terminal device 200 cannot determine which antenna panel and beam should be used because of the presence of the plurality of sets, even with a rule that the set at reception of SSB is to be used as a default.

(10-7) Reference Signal Resource Set and Beam Sweeping

FIGS. 8 and 9 are diagrams related to reference signal resource sets. As illustrated in FIG. 8, the resource (RS Resource) for transmitting the reference signal is designated by the frequency and time resources. Such reference signal resources can be treated as a reference signal resource set by forming a plurality of reference signals into one group (signal group). The base station 100 performs beam sweeping by transmitting beams in different directions using the individual reference signal resources of this resource set. It would be also possible to prepare resources for separate reference signals and perform beam sweeping without using the resource set. Still, in order to avoid complication of the settings, it is desirable to set the resource set to ensure the resources as a signal group and use the resource set for beam sweeping.

(10-8) Relationship Between Reference Signal Resource Set and Antenna Panel

It is natural to consider that the resource of each of the reference signals in the resource set belongs to one antenna panel. Moreover, as illustrated in FIG. 9, when there are different resource sets, assumable cases include a case where the sets use different antenna panels (relationship between resource set (1) and resource set (3) in FIG. 9) or a case where the sets use the same antenna panel (relationship between the resource set (1) and the resource set (2) in FIG. 9).

1.3. Outline of Proposed Technology

The base station 100 has conventionally performed beam sweeping operations without considering the arrangement of the transmitting antenna panels, and thus, unnecessary reception processes have been performed on the terminal device 200 side, for example. Specifically, when a base station transmits a plurality of reference signal resource sets (that is, signal groups) to a terminal, the base station transmits the resource set from each of a plurality of antenna panels facing the same direction in some cases. In such a case, the transmitting antenna panels have the same orientation although the resource sets are different on the terminal side, and thus, the receiving antenna panels on the terminal side will also be the same with a high possibility. That is, in the prior technology, the signal group has been transmitted without considering the arrangement of the antenna panels on the base station side, leading to a concern of occurrence of unnecessary reception processes on the terminal side.

Therefore, the base station 100 according to the embodiment transmits, to the terminal device 200, similarity information indicating the similarity of the beam characteristics of the transmitting antenna panels in the plurality of signal groups (resource sets) to be transmitted to the terminal device 200. Thereafter, the terminal device 200 selects and receives the signal group from among the plurality of signal groups based on the acquired similarity information.

Specifically, the base station 100 according to the embodiment notifies the terminal device 200 of similarity information indicating that the beam characteristics of the transmitting antenna panels for transmitting each of the plurality of resource sets are similar (for example, the coherent antenna panel). In a case where the terminal device 200 has acquired such similarity information, the terminal device 200 performs the reception process on one resource set among the plurality of resource sets having similar beam characteristics, while omitting the reception processes on the other resource sets.

That is, the terminal device 200 performs a beam determination process and a reporting process of the determined beam to the base station 100 only for one received resource set, and does not have to perform the determination process or reporting process for the other resource sets. Therefore, the terminal device 200 according to the embodiment can reduce unnecessary signal processing.

2. Configuration Examples

Hereinafter, the configurations of the base station 100 (base station device 100) and the terminal device 200 according to the present embodiment will be described in detail.

2.1. Configuration Example of Base Station

Figure 10:
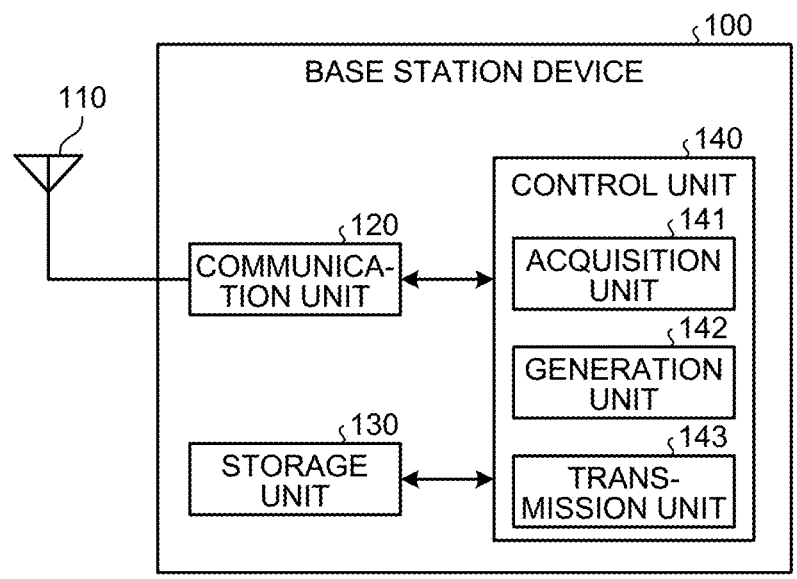
FIG. 10 is a block diagram illustrating an example of a configuration of a base station device according to an embodiment.

FIG. 10 is a block diagram illustrating an example of a configuration of the base station device 100 according to the embodiment. As illustrated in FIG. 10, the base station device 100 includes an antenna unit 110, a communication unit 120, a storage unit 130, and a control unit 140.

The antenna unit 110 radiates the signal output by the communication unit 120 to space as a radio wave. Furthermore, the antenna unit 110 converts the radio wave in space into a signal and outputs the signal to the communication unit 120. Specifically, the antenna unit 110 has a plurality of antenna elements and can form a beam.

The communication unit 120 transmits and receives signals by radio communication. For example, the communication unit 120 receives a downlink signal from the terminal device 200 and transmits an uplink signal to the terminal device 200.

Incidentally, the antenna unit 110 and the communication unit 120 are provided as a configuration including the plurality of antenna panels 70 having the analogue-digital hybrid antenna architecture described above. For example, the antenna unit 110 corresponds to the antenna 72. Furthermore, for example, the communication unit 120 corresponds to the digital circuit 50, the analogue circuit 60, and the phase shifter 71.

The storage unit 130 temporarily or permanently stores various programs and various types of data for the operation of the base station device 100.

The control unit 140 controls the operation of the entire base station device 100 to provide various functions of the base station device 100. As illustrated in FIG. 10, the control unit 140 includes an acquisition unit 141, a generation unit 142, and a transmission unit 143.

The acquisition unit 141 acquires various types of information from the terminal device 200. For example, the acquisition unit 141 acquires capability information indicating that it is possible to selectively receive a signal group (resource set) from the terminal device 200. That is, the acquisition unit 141 acquires capability information indicating that when a plurality of signal groups having similar beam characteristics has been transmitted, the terminal device 200 can omit the reception process for at least one or more signal groups among the plurality of signal groups.

The generation unit 142 generates similarity information indicating the similarity of the beam characteristics of the transmitting antenna panels in the plurality of signal groups to be transmitted to the terminal device 200. For example, the generation unit 142 generates similarity information indicating that the beam characteristics of the transmitting antenna panels are similar when the plurality of transmitting antenna panels transmitting the plurality of signal groups are coherent antenna panels.

The transmission unit 143 transmits the similarity information generated by the generation unit 142 to the terminal device 200. For example, based on the capability information acquired by the acquisition unit 141, the transmission unit 143 transmits similarity information to the terminal device 200 when the terminal device 200 is capable of selectively receiving a signal group. This makes it possible to eliminate an unnecessary transmission process of transmitting similarity information to a terminal that cannot selectively receive a plurality of signal groups having similar beam characteristics.

Detailed operation of each of configurations in the control unit 140 of the base station device 100 will be described below.

2.2. Configuration Example of Terminal Device

Figure 11:
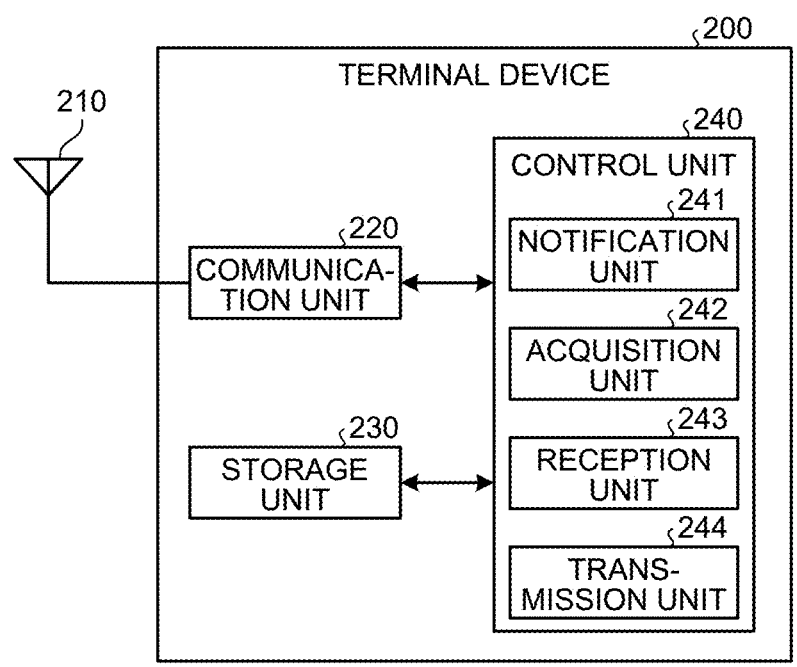
FIG. 11 is a block diagram illustrating an example of a configuration of a terminal device according to an embodiment.

FIG. 11 is a block diagram illustrating an example of a configuration of the terminal device 200 according to the embodiment. As illustrated in FIG. 11, the terminal device 200 includes an antenna unit 210, a communication unit 220, a storage unit 230, and a control unit 240.

The antenna unit 210 radiates the signal output by the communication unit 220 to space as a radio wave. Furthermore, the antenna unit 210 converts the radio wave in space into a signal and outputs the signal to the communication unit 220. Specifically, the antenna unit 210 has a plurality of antenna elements and can form a beam.

The communication unit 220 transmits and receives signals by radio communication. For example, the communication unit 220 receives a downlink signal from the base station 100 and transmits an uplink signal to the base station 100.

The antenna unit 210 and the communication unit 220 are provided as a configuration including the plurality of antenna panels 70 having the analogue-digital hybrid antenna architecture described above. For example, the antenna unit 210 corresponds to the antenna 72. Furthermore, for example, the communication unit 220 corresponds to the digital circuit 50, the analogue circuit 60, and the phase shifter 71.

The storage unit 230 temporarily or permanently stores various programs and various types of data for the operation of the terminal device 200.

The control unit 240 controls the operation of the entire terminal device 200 to provide various functions of the terminal device 200. As illustrated in FIG. 11, the control unit 240 includes a notification unit 241, an acquisition unit 242, a reception unit 243, and a transmission unit 244.

The notification unit 241 notifies the base station 100 of the capability information indicating that it is possible to selectively receive the signal group transmitted from the base station 100. Furthermore, the notification unit 241 notifies the base station 100 of the characteristic information regarding the beam characteristics of the antenna panel that receives the signal group. Although the details will be described below, by acquiring the characteristic information, the base station 100 can designate, when transmitting the signal group, which receiving antenna panel should be used for receiving the signal group from among a plurality of receiving antenna panels having similar beam characteristics.

The acquisition unit 242 acquires various types of information from the base station 100. For example, the acquisition unit 242 acquires similarity information indicating the similarity of the beam characteristics of the transmitting antenna panel in a plurality of signal groups transmitted from the base station 100. Furthermore, the acquisition unit 242 acquires receiving panel information that designates the antenna panel to receive the signal group from the base station 100. In addition, the acquisition unit 242 acquires transmitting panel information that designates an antenna panel that transmits a signal group from the base station 100.

The reception unit 243 selects and receives a signal group to be received from among a plurality of signal groups based on the similarity information acquired by the acquisition unit 242. For example, the reception unit 243 omits the reception process on signal groups other than the selected signal group. Furthermore, the reception unit 243 receives the signal group by the antenna panel designated by the receiving panel information acquired by the acquisition unit 242.

The transmission unit 244 transmits a predetermined signal group to the base station 100. For example, the transmission unit 244 transmits a signal group by using the antenna panel designated by the transmitting panel information acquired by the acquisition unit 242. Furthermore, the transmission unit 244 transmits the signal group to the base station 100 by using the antenna panel that has received the signal group transmitted from the base station 100.

Hereinafter, detailed operations of individual configurations in the control unit 140 of the base station device 100 and individual configurations in the control unit 240 of the terminal device 200 will be described with reference to FIGS. 12 to 17.

3. Embodiments

For example, there are cases of having a plurality of transmitting antenna panels of the base station 100 arranged to face the same direction or arranged to face different directions.

When the plurality of transmitting antenna panels of the base station 100 are arranged facing different directions, the plurality of resource sets transmitted from the respective transmitting antenna panels have dissimilar beam characteristics, and thus are likely to be received by different receiving antenna panels of the terminal device 200.

In contrast, when the plurality of transmitting antenna panels of the base station 100 are arranged facing the same direction, the plurality of resource sets transmitted from the respective transmitting antenna panels have similar beam characteristics, and thus are likely to be received by the same receiving antenna panel of the terminal device 200.

Here, when the plurality of resource sets has been received by different receiving antenna panels, the terminal device 200 selects the optimum reference signal (for example, signal having high reception power) for each of the resource sets and reports the signal to the base station 100.

In contrast, when the plurality of resource sets has been received by different receiving antenna panels, the operation in which the terminal device 200 selects the optimum reference signal (for example, signal having high reception power) for each of resource sets and reports the signal to the base station 100 would involve an unnecessary selection process and a reporting process.

In view of this, the base station 100 according to the embodiment performs the setting onto the terminal device 200 that the plurality of transmitting antenna panels is facing the same direction. That is, the transmission unit 143 of the base station 100 performs terminal settings by transmitting similarity information indicating that a plurality of transmitting antenna panels facing the same direction will be arranged to face the same direction. In other words, the base station 100 sets the terminal by transmitting similarity information indicating that a plurality of resource sets has been transmitted from the plurality of transmitting antenna panels facing the same direction. In still other words, the base station 100 sets the terminal by transmitting similarity information indicating that the beam characteristics of the plurality of resource sets are the same.

The base station 100 performs beam sweeping for each of the plurality of resource sets by using the transmitting antenna panel. The terminal device 200 selects, for example, a reference signal having a high reception power from one resource set, and reports the identification information of the selected reference signal to the base station 100.

Furthermore, the terminal device 200 does not perform the process of selecting or reporting the optimum reference signal for the resource set having beam characteristics similar to the resource set for which the report has been completed. For this reason, the base station 100 has no expectation to receive, from the terminal device 200, a report related to a resource set having similar beam characteristics. That is, the terminal device 200 side does not perform the reference signal selection process or the reporting process, and the base station 10 side does not perform the process of receiving the report from the terminal device 200, and the like.

In this manner, according to the communication method of the embodiment, it is possible to reduce unnecessary signal processing on the terminal device 200 and the base station 100. Therefore, for example, in the terminal device 200, the transmission/reception by the antenna panel having a high processing load can be replaced by the antenna panel that does not perform the above selection process or reporting process.

Figure 12:
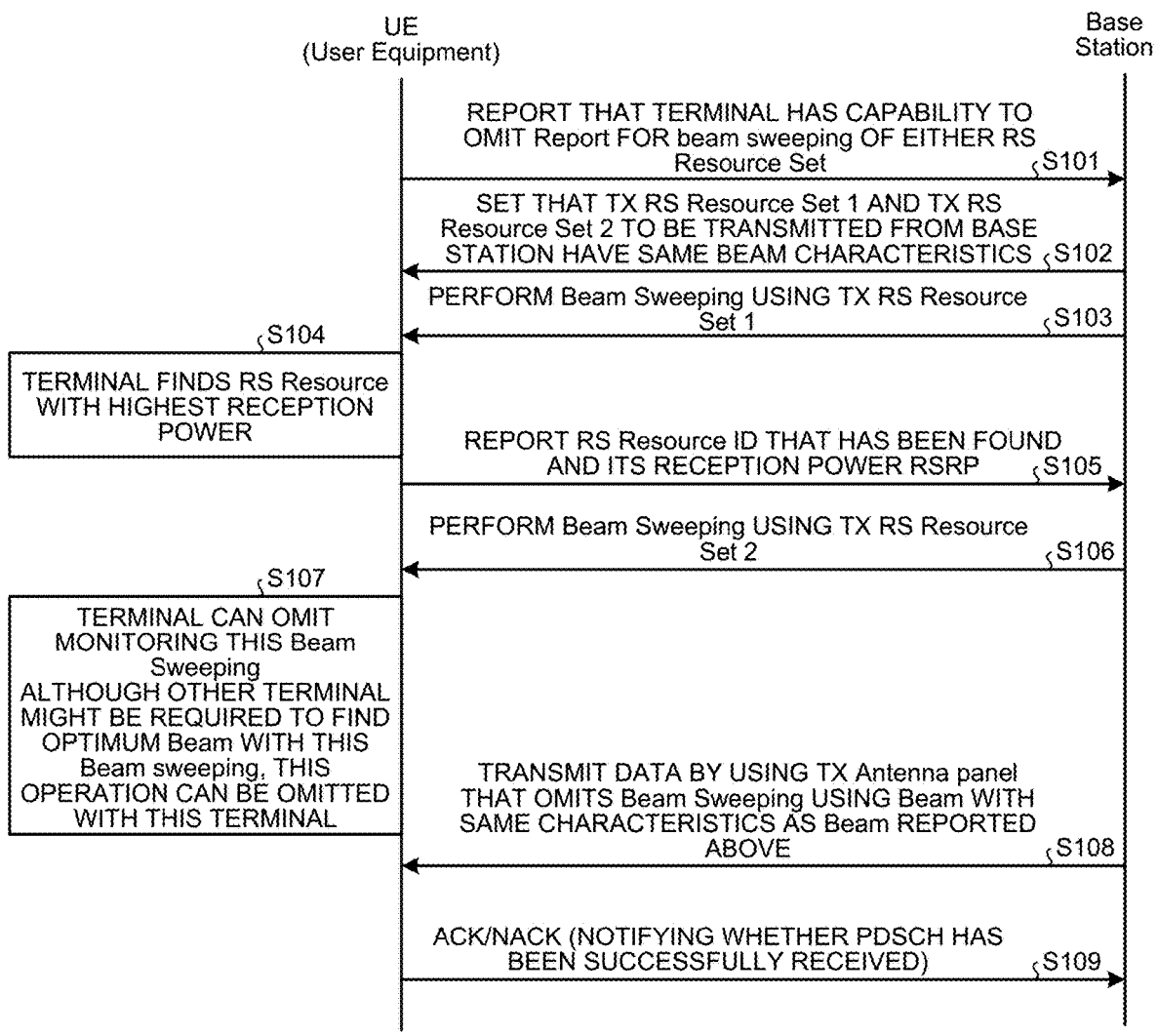
FIG. 12 is a sequence diagram illustrating an example of a flow of a beam selection procedure executed by a base station and a terminal device.

FIG. 12 is a sequence diagram illustrating an example of a flow of a beam selection procedure executed by the base station 100 and the terminal device 200. First, the notification unit 241 of the terminal device 200 notifies the base station 100 of the above-described capability information. In the example illustrated in FIG. 12, the notification unit 241 notifies the base station 100 of capability information that the terminal device 200 has the capability to omit reporting regarding beam sweeping of at least one resource set among a plurality of resource sets (signal groups) (step S101).

Subsequently, the base station 100 sets in the terminal that the beam characteristics of the plurality of resource sets transmitted from the base station 100 are the same (similar) (step S102). Subsequently, the base station 100 performs beam sweeping using one of the resource sets (step S103).

Subsequently, the terminal device 200 determines the reference signal having the highest reception power from among the resource sets to which beam sweeping has been applied (step S104). Subsequently, the terminal device 200 reports the determined reference signal identification information and the reception power to the base station 100 (step S105).

Subsequently, the base station 100 performs beam sweeping using another resource set (step S106). The terminal device 200 omits the monitoring of the beam sweeping of such a resource set (step S107). Note that the other terminal device 200 needs to determine the reference signal having the highest reception power from among the resource sets to which beam sweeping has been applied.

Subsequently, using the transmitting antenna panel when the terminal device 200 has omitted the beam sweeping, the base station 100 transmits various types of data (PDSCH, or the like) using a beam having the same beam characteristics as the beam corresponding to the reference signal reported in step S105 (step S108). Thereafter, the terminal device 200 notifies the base station 100 whether the PDCSH has been successfully received, for example (step S109).

Although FIG. 12 has described the case where the base station 100 performs beam sweeping on the downlink, this procedure can also be applied to the case where the terminal device 200 performs beam sweeping on the uplink.

Figure 13:
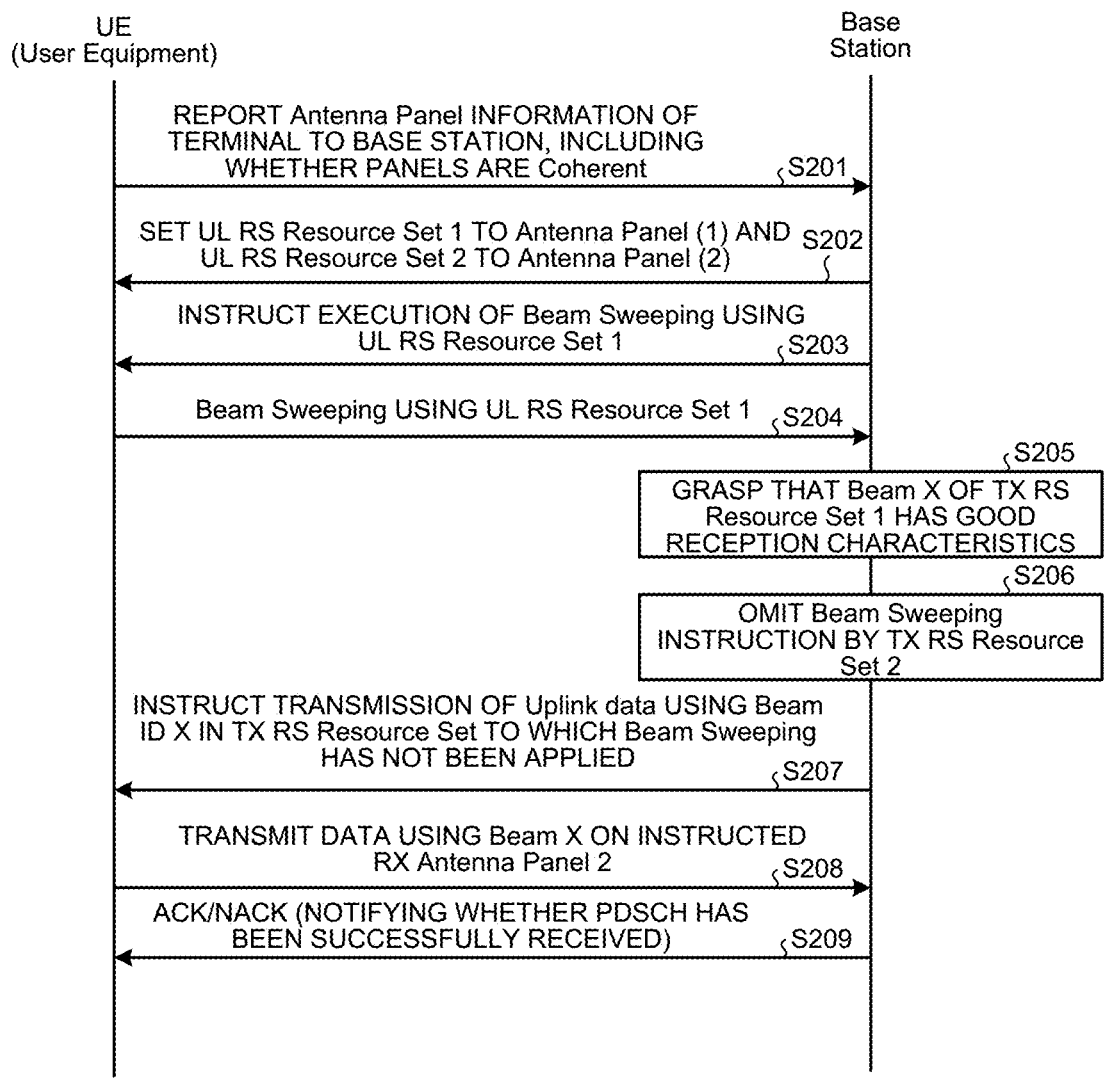
FIG. 13 is a sequence diagram illustrating an example of a flow of a beam selection procedure executed by a base station and a terminal device.

FIG. 13 is a sequence diagram illustrating an example of a flow of a beam selection procedure executed by the base station 100 and the terminal device 200. As illustrated in FIG. 13, the terminal device 200 reports the information regarding the antenna panel of the terminal device 200 to the base station 100 (step S201).

Next, the base station 100 sets the resource set (1) to the antenna panel (1) and sets the resource set (2) to the antenna panel (2), for example (step S202). Note that the resource set (1) and the resource set (2) are assumed to have similar beam characteristics. Subsequently, the base station 100 instructs the terminal device 200 to perform beam sweeping using the resource set (1) (step S203).

Subsequently, the terminal device 200 uses the resource set (1) to perform beam sweeping (step S204). The base station 100 grasps a beam (X) of the reference signal having a high reception power within the resource set (1) to which beam sweeping has been applied (step S205).

Subsequently, the base station 100 omits an instruction to perform beam sweeping that uses the resource set (2) (step S206). Subsequently, the base station 100 instructs the transmission of predetermined data (PDSCH) by using the beam (X) within the resource set (2) to which no beam sweeping has been applied (step S207).

Subsequently, the terminal device 200 transmits the PDCSH, for example, using the beam (X) of the antenna panel (2) corresponding to the instructed resource set (2) (step S208). Subsequently, the base station 100 notifies the terminal device 200 whether the PDSCH has been successfully received (step S209).

Figure 14A:
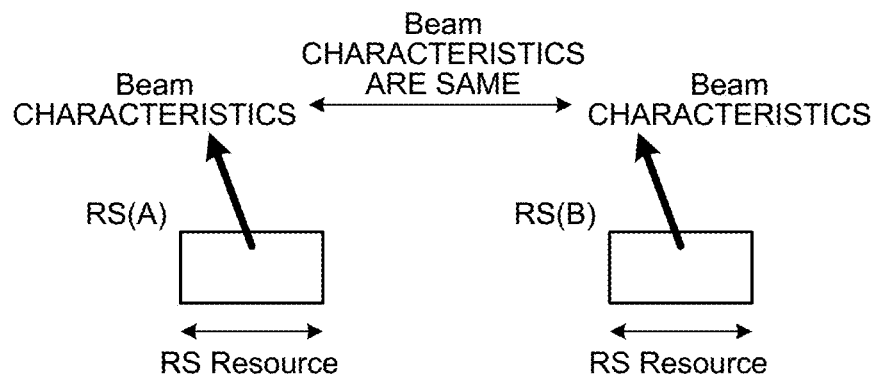
FIG. 14A illustrates a reference signal with the same beam characteristics.

Designating Receiving Beam to be Used in the Terminal Device 200 by the Antenna Panel FIG. 14A illustrates a reference signal with the same beam characteristics. Conventionally, when the base station 100 has designated the receiving beam to be used at reception on the terminal device 200, the base station 100 sets an instruction onto the terminal device 200 to use the same receiving beam as the beam used at the reception of the reference signal.

That is, as illustrated in FIG. 14A, the base station 100 sets, onto the terminal device 200, that the reference signal A and the reference signal B have the same beam characteristics, and at the transmission of the reference signal B thereafter, the terminal device 200 has successfully received the reference signal B using the receiving beam used at the reception of the reference signal A. At this time, by designating one resource defined by the frequency resource and the time resource, the reference signal A has successfully instructed to use the receiving beam used at the reception of the designated resource.

Meanwhile, with a plurality of receiving antenna panels mounted on the terminal device 200 side, it would be desired to indicate, from the base station 100, both the receiving antenna panel and the receiving beam to be used. In this case, similarly to the conventional case, it would be sufficient to instruct to use the same receiving antenna panel and receiving beam as the ones used at the reception of the reference signal A. Accordingly, similarly to the conventional case, after issuing an instruction to the terminal device 200 that the reference signal A and the reference signal B have same beam characteristic, it has been possible with the reference signal B to designate the receiving antenna panel and the receiving beam to be used by the terminal device 200.

There might be a case, however, where it is desired to separately instruct the receiving antenna panel and the receiving beam to be used at the reception, from the base station 100 to the terminal device 200. For example, there might be a case where it is desired to designate the receiving antenna panel in semi-static manner and to dynamically designate the receiving beam by the PDCCH (control signal). This case occurs because it would take time to switch the antenna panels, but it would not take much time to switch the beams in the same antenna panel, for the terminal device 200. On the contrary, there might be a case where it is desired to designate the receiving beam in semi-static manner and to dynamically designate the receiving antenna panel by the PDCCH (control signal).

Figure 14B:
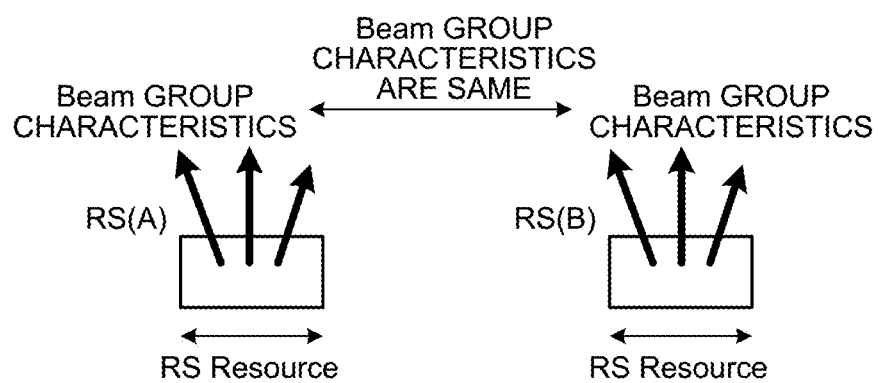
FIG. 14B is a diagram illustrating a case where the receiving antenna panels on the terminal side are coherent.

FIG. 14B is a diagram illustrating a case where the receiving antenna panels on the terminal device 200 side are coherent. That is, the two receiving antenna panels of the terminal device 200 are arranged on a same plane, indicating that the beam characteristics of the receiving beams are the same. In this case, for example, there is an assumable case where it is desired to perform reception using a beam (i) of the antenna panel on the left side illustrated in FIG. 14B while it is required to perform reception on the antenna panel on the left side using a beam (j) different from the beam (i). This is because, during that time for scheduling reasons, the beam (j) has to be used for receiving a signal from another base station 100 in some cases. At that time, the terminal device 200 can perform reception using the same beam (i) on the right antenna panel having the same beam characteristics and reception using the beam (j) on the left antenna panel. In such a case, it would be conceivable to have a case where although receiving beam designation is set to semi-static, only the antenna panel is to be dynamically switched. As described above, there are cases where it is desired to designate the receiving beam and the antenna panel separately from each other.

In view of this, the base station 100 designates the antenna panel by using the receiving antenna panel that has received the reference signal by beam sweeping. That is, the terminal device 200 acquires the receiving panel information designating the receiving antenna panel used at the reception of the resource set from the base station 100, and then receives a resource set or a reference signal in the resource set by using the receiving antenna panel designated by the receiving panel information. Incidentally, the antenna panel may be designated in a semi-static manner by RRC signaling or dynamically designated by the PDCCH.

Figure 15:
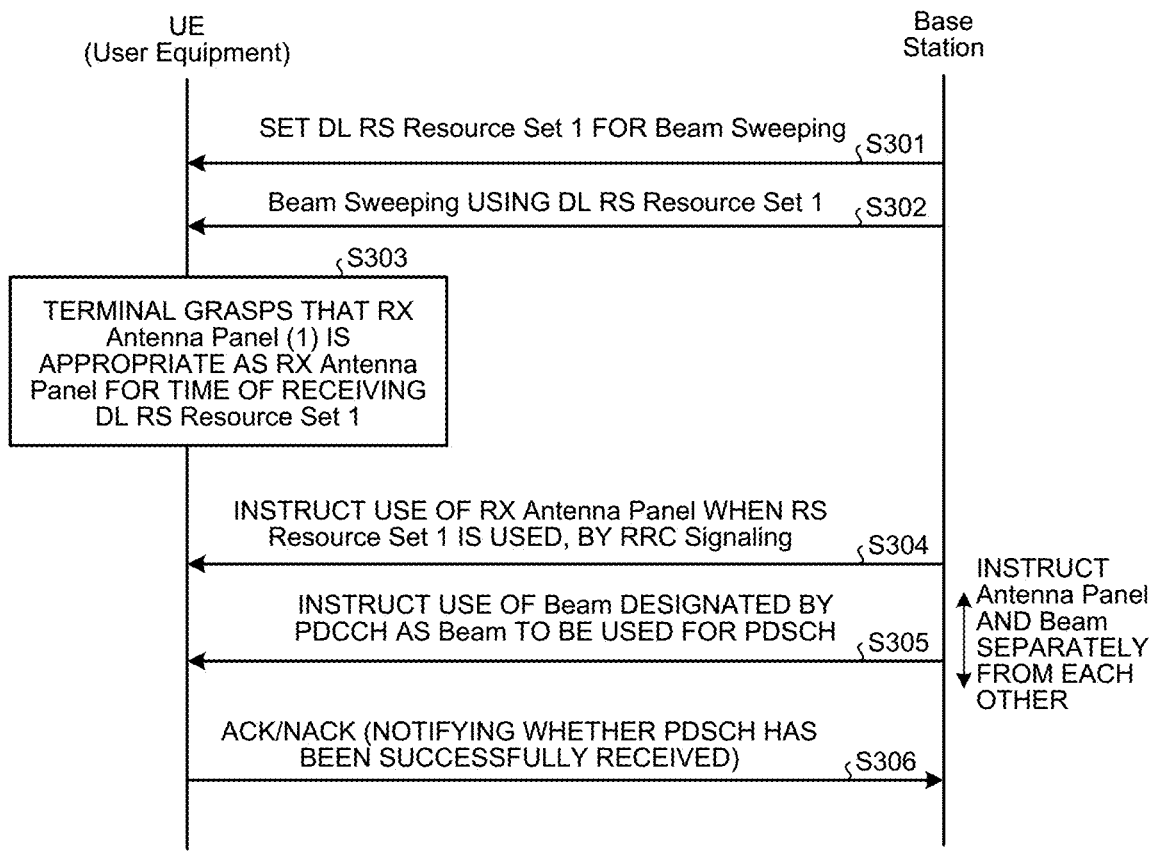
FIG. 15 is a sequence diagram illustrating an example of a flow of a beam selection procedure executed by a base station and a terminal device.

FIG. 15 is a sequence diagram illustrating an example of a flow of a beam selection procedure executed by the base station 100 and the terminal device 200. As illustrated in FIG. 15, the base station 100 sets on the terminal device the resource set (1) to which beam sweeping will be applied (step S301).

Subsequently, the base station 100 performs beam sweeping using the resource set (1) set on the terminal (step S302). Subsequently, the terminal device 200 determines the receiving antenna panel (1) as the antenna panel when receiving the resource set (1) based on the reception power, for example (step S303).

Subsequently, the base station 100 instructs the use of the receiving antenna panel (1), which is the antenna panel that has received the resource set (1) by RRC signaling, for example (step S304).

Subsequently, the base station 100 instructs, for example, to use the receiving beam used for the PDCCH as a receiving beam to be used for reception of the PDSCH (step S305). That is, the antenna panel is designated in step S304, and the beam is designated in step S305, making it possible to designate the antenna panel and the beam separately from each other.

When the PDSCH has been transmitted from the base station 100, the terminal device 200 notifies whether the PDSCH has been successfully received (step S306).

Uplink Antenna Panel Designation Method

Beam sweeping in a normal downlink (hereinafter referred to as a DL) uses resource sets of a plurality of DLs from the base station 100 to achieve beam sweeping in different directions. The terminal device 200 monitors reference signals transmitted by a plurality of resources and determines which beam corresponding to which reference signal is to be optimum. On the other hand, the uplink (hereinafter referred to as a UP) also uses a beam sweeping procedure. Beam sweeping is performed in different directions when viewed from the terminal device 200 by using a resource set of a plurality of UPs from the terminal device 200. The UP resource set used by the terminal device 200 is a resource to be set from the base station 100 onto the terminal device 200.

In order to ensure the diversity of the communication path, the base station 100 might desire to perform a plurality of communications between the terminal device 200 and the base station 100 on variable communication paths as much as possible. For example, as illustrated in FIG. 7, two different communication paths are ensured, and thus, even when one path is blocked, communication interruption will be suppressed by using the other path. This is effective in a same manner on the DL side and the UP side. In particular, since there are many cases where a car or a person to be an obstacle of the communication path is present near the terminal device 200, it is important to ensure a communication path in different directions from the viewpoint of the terminal device 200. In that case, it is most important to grasp the beams whose directions are significantly different when viewed from the terminal device 200 side. It is considered that the same beam path can be applied not only to UP communication but also to DL communication. For that purpose, regarding the beam sweeping of the UP performed by the terminal device 200, it would be important to allow the base station 100 to monitor beams of the beam sweeping with different transmitting antenna panels, thereby ensuring UP communication paths having high spatial diversity between the base station 100 and the terminal device 200. In such cases, however, how to distinguish the transmitting antenna panel would be important.

Therefore, the base station 100 designates the transmitting antenna panel of the terminal device 200 to allocate the UP resource set to the terminal device 200. Specifically, the terminal device 200 first notifies the base station 100 of information such as the number of transmitting antenna panels and the arrangement (coherent or non-coherent) thereof, that is, characteristic information regarding the beam characteristics of the antenna panels.

The base station 100 then designates a transmitting antenna panel to be used for UP beam sweeping by the terminal device 200 based on the notified characteristic information, and requests beam sweeping. Subsequently, the terminal device 200 performs beam sweeping using the designated transmitting antenna panel and resource set. In this manner, by designating by the terminal device 200 the resource set and the transmitting antenna panel that should be used for transmission, the terminal device 200 can clarify which transmitting antenna panel should be used for each of resource sets.

Figure 16:
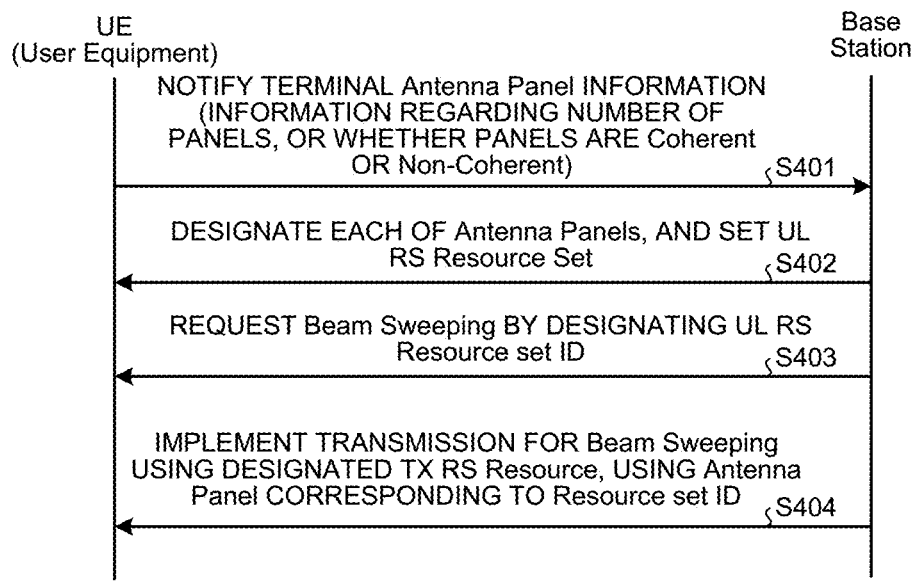
FIG. 16 is a sequence diagram illustrating an example of a flow of a beam selection procedure executed by a base station and a terminal device.

FIG. 16 is a sequence diagram illustrating an example of a flow of a beam selection procedure executed by the base station 100 and the terminal device 200. As illustrated in FIG. 16, the terminal device 200 notifies information regarding the antenna panel of the terminal device 200 (the number of antenna panels and the characteristic information regarding whether the antenna panels are coherent) (step S401).

Subsequently, based on the information related to the antenna panel notified from the terminal device 200, the base station 100 designates the transmitting antenna panel to be used for UP beam sweeping, and sets the resource set (step S402). The base station 100 then designates identification information of the resource set that has been set, and requests beam sweeping (step S403).

The terminal device 200 performs beam sweeping using the designated resource set and transmitting antenna panel (step S404).

When Base Station 100 Cannot Directly or Explicitly Grasp Transmitting Antenna Panel for Terminal Device 200

The above has described the case where the base station 100 acquires the information related to the antenna panel from the terminal device 200 and grasps the characteristics of the antenna panel of the terminal device 200. Here, there is an assumable case where the base station 100 cannot grasp the characteristics of the antenna panel of the terminal device 200. In such a case, it is difficult for the base station 100 to designate a transmitting antenna panel for performing UP beam sweeping.

To handle this, the base station 100 associates the receiving antenna panel used at the reception of the DL reference signal by the terminal device 200 with the transmitting antenna panel to be used to perform UP beam sweeping. That is, the base station 100 instructs to use, as a transmitting antenna panel, the same antenna panel as the receiving antenna panel used by the terminal device 200 at the reception of the DL reference signal or the DL resource set. The terminal device 200 performs UP beam sweeping using the instructed transmitting antenna panel and the resource set that has been set. At this time, the terminal device 200 can freely determine the beam direction to be used to transmit the reference signal of the resource set that has been set. That is, the base station 100 has implicitly designated the transmitting antenna panel alone.

In this manner, the base station 100 can allow the terminal device 200 to freely select the beam while implicitly designating the transmitting antenna panel for the terminal device 200.

Incidentally, when the transmitting antenna panel for the terminal device 200 is implicitly designated, the beam characteristics of the receiving antenna panel of the terminal device 200 and the beam characteristics of the transmitting antenna panel need to be similar (or the same). Since the antenna elements of the antenna panel are the same for transmission and reception, antenna calibration needs to be performed so that the variation in the transfer function of the analogue circuit at the time of reception and the analogue circuit at the time of transmission would be adjusted to achieve a match in characteristics between at the time of reception and at the time of transmission. The antenna calibration is performed in a general method utilized in ordinary radio systems, and the present invention presupposes that the antenna calibration has been completed. The antenna calibration can be performed by the terminal device 200 alone. Therefore, with antenna calibration performed just once after startup of the terminal device 200, the state can be maintained for about one day, for example.

Figure 17:
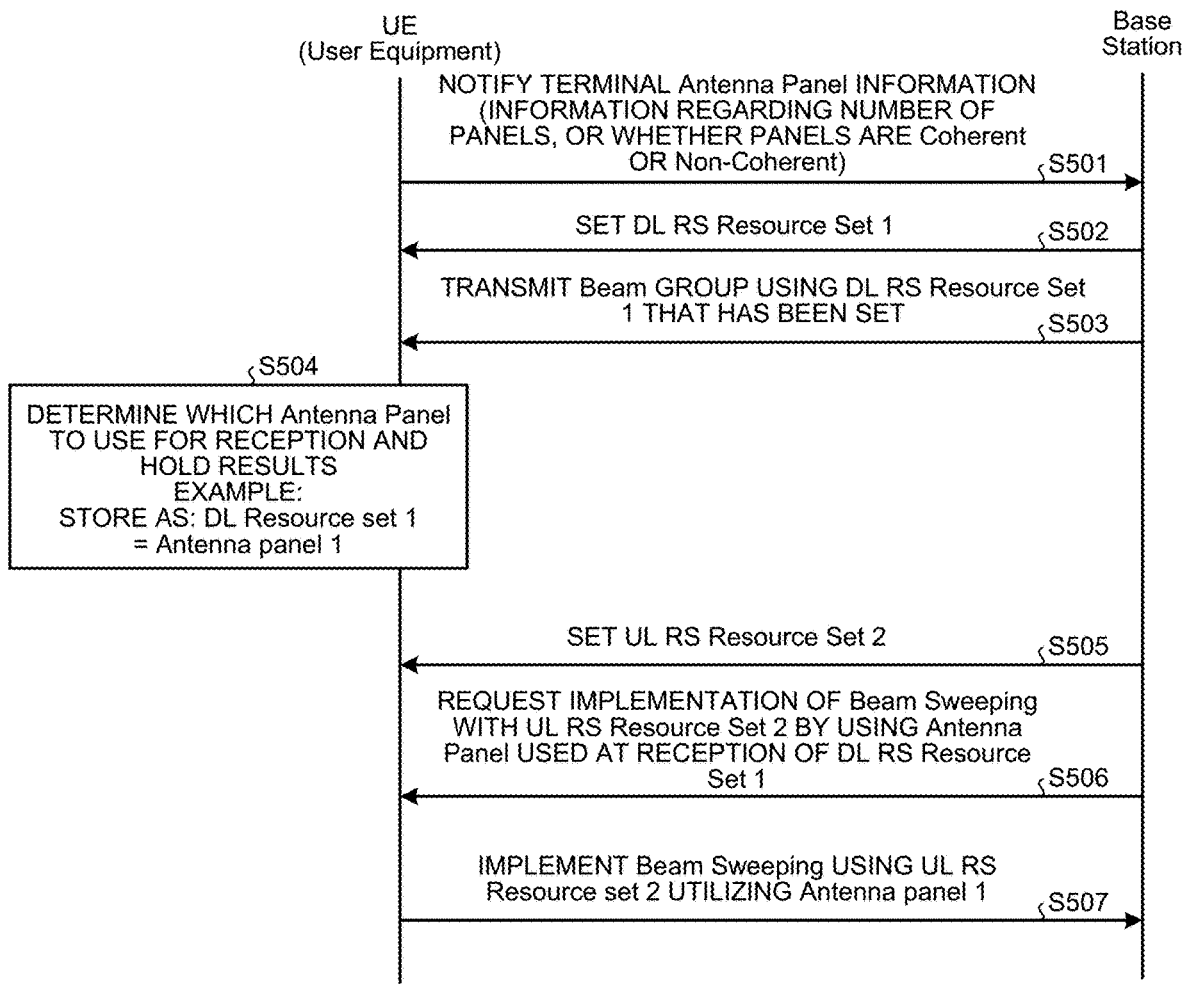
FIG. 17 is a sequence diagram illustrating an example of a flow of a beam selection procedure executed by a base station and a terminal device.

FIG. 17 is a sequence diagram illustrating an example of a flow of a beam selection procedure executed by the base station 100 and the terminal device 200. As illustrated in FIG. 17, the terminal device 200 notifies the base station 100 of information related to the antenna panel of the terminal device 200 (step S501).

Subsequently, the base station 100 sets the DL resource set (1) onto the terminal (step S502). The base station 100 then performs beam sweeping using the resource set (1) that has been set (step S503).

Subsequently, the terminal device 200 determines and holds the antenna panel (1) to be used for receiving the DL resource set (1) based on the reception power, for example (step S504). Thereafter, the base station 100 sets the UP resource set (2) onto the terminal (step S505).

The base station 100 then requests to perform UP beam sweeping with the UP resource set (2) by using the antenna panel (1) that has received the DL resource set (1) (step S506).

Subsequently, the terminal device 200 performs beam sweeping using the designated antenna panel (1) and resource set (2) (step S507).

4. Application Examples

The technology according to the present disclosure is applicable to various products.

For example, the base station 100 may be any of eNodeB, ng-eNodeB, gNodeB, or en-gNodeB as described above. In addition to or instead of this, the base station 100 may be referred to as EUTRAN when the base station 100 is either eNodeB or en-gNodeB. In addition to or instead of this, the base station 100 may be referred to as NGRAN when the base station 100 is either gNodeB or ng-eNodeB. Furthermore, the base station 100 may be a Master Node (MN) or a Secondary Node (SN) in Dual Connectivity. That is, the base station 100 may be a Secondary gNodeB in the case of EUTRA-NR Dual Connectivity or in the case of NR-NR Dual Connectivity. In this case, a part or all of the above-described RRC signaling may be transmitted to and received from the UE (terminal device 200) via the MN, or may be directly transmitted or received between the UE (terminal device 200) and a secondary gNodeB (base station 100) via a Signaling Radio Bearer (SRB) 3. The above-described PDCCH and PDSCH may be transmitted in a Secondary Cell Group (SCG) between the UE (terminal device 200) and the secondary gNodeB (base station 100). In addition to or instead of this, the base station 100 may be a Master gNodeB in the case of NR-EUTRA Dual Connectivity or in the case of NR-NR Dual Connectivity. In this case, the above-described RRC signaling may be transmitted or received between the UE (terminal device 200) and the Master gNodeB (base station 100) via any of SRBs 0 to 2. The above-described PDCCH and PDSCH may be transmitted in a Master Cell Group (MCG) between the UE (terminal device 200) and the Master gNodeB (base station 100). In addition to or instead of this, the above-described base station 100 may be a gNB Central Unit (gNB-CU) or a gNB Distributed Unit (gNB-DU) or a combination of gNB-CU and gNB-DU (i.e. gNB). The gNB-CU hosts the RRC layer, SDAP layer, and PDCP layer for a certain UE. On the other hand, gNB-DU hosts the RLC layer, MAC layer, and PHY layer for a certain UE. That is, a part or all of the above-described RRC signaling may be terminated between the UE and gNB-CU via gNB-DU. A part or all of the downlink RRC signaling may be generated by gNB-CU. On the other hand, the above-described PDCCH and PDSCH may be generated by gNB-DU and transmitted to the UE. In addition to or instead of this, the base station 100 may be implemented as a macro eNB, a small eNB, or the like. The small eNB may be an eNB that covers cells smaller than the macro cell, such as a pico eNB, a micro eNB, or a home (femto) eNB. In addition to or instead of this, the base station 100 may be implemented as other types of base station such as Node B or a Base Transceiver Station (BTS). The base station 100 may include a main body (also referred to as a base station device) that controls radio communication, and one or more Remote Radio Heads (RRHs) arranged at a location different from the main body. Furthermore, various types of terminals, which will be described below, may operate as the base station 100 by temporarily or semi-permanently executing the base station function.

Furthermore, for example, the terminal device 200 may be implemented as a mobile terminal such as a smartphone, a tablet Personal Computer (PC), a notebook PC, a portable game terminal, a portable/dongle type mobile router, and a digital camera, or as an in-vehicle terminal such as a car navigator. Furthermore, the terminal device 200 may be implemented as a terminal (also referred to as a Machine Type Communication (MTC) terminal) that performs Machine To Machine (M2M) communication. Furthermore, the terminal device 200 may be a radio communication module (for example, an integrated circuit module formed of one die) mounted on these terminals.

4.1. Application Examples Related to Base Station

First Application Example

Figure 18:
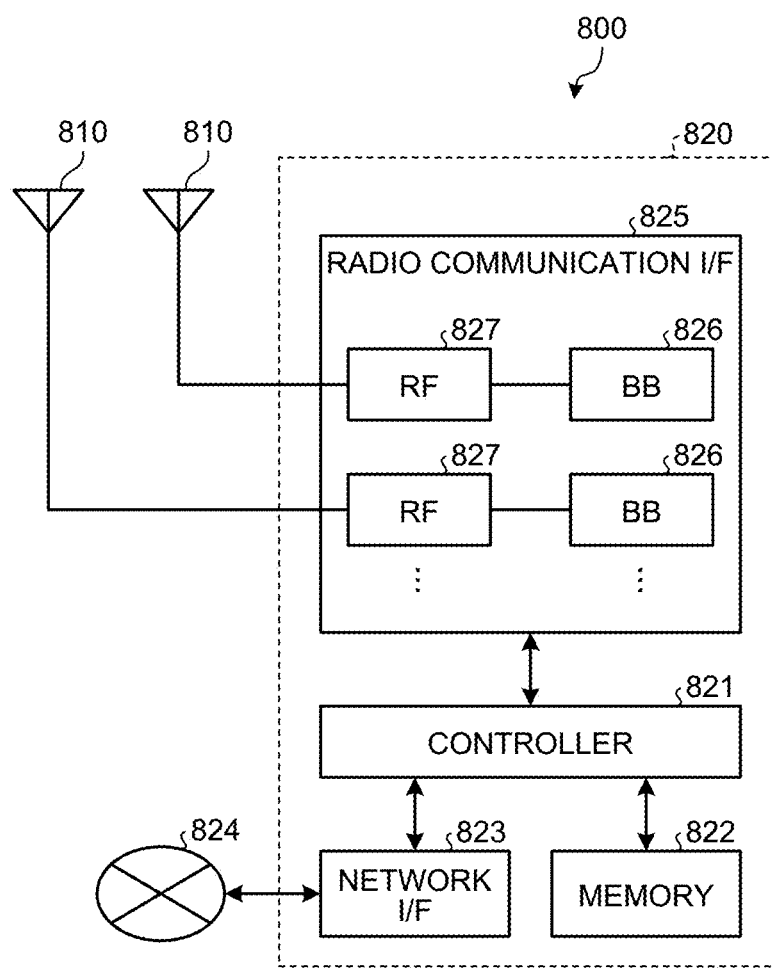
FIG. 18 is a block diagram illustrating a first example of a schematic configuration of a gNB to which the technology according to the present disclosure is applicable.

FIG. 18 is a block diagram illustrating a first example of a schematic configuration of a gNB to which the technology according to the present disclosure is applicable. A gNB 800 has one or more antennas 810 and a base station device 820. Each of the antennas 810 and the base station device 820 may be connected to each other via an RF cable. The technique of the present disclosure may be applied to eNB instead of gNB.

Each of the antennas 810 has a single or a plurality of antenna elements (for example, a plurality of antenna elements constituting a MIMO antenna) and is used for transmission and reception of radio signals by the base station device 820. The gNB 800 has a plurality of antennas 810 as illustrated in FIG. 18, and the plurality of antennas 810 may each correspond to a plurality of frequency bands used by the gNB 800, for example. Although FIG. 18 illustrates an example in which the gNB 800 has the plurality of antennas 810, the gNB 800 may have a single antenna 810.

The base station device 820 includes a controller 821, memory 822, a network interface 823, and a radio communication interface 825.

The controller 821 may be a CPU or DSP, for example, and controls operation of various functions of an upper layer of the base station device 820. For example, the controller 821 generates a data packet from the data in the signal processed by the radio communication interface 825 and transfers the generated packet via the network interface 823. The controller 821 may generate a bundled packet by bundling data from a plurality of baseband processors and transfer the generated bundled packet. In addition, the controller 821 may include logical functions that execute controls such as radio resource control, radio bearer control, mobility management, admission control, or scheduling. Furthermore, the control may be executed in cooperation with surrounding gNBs or core network nodes. The memory 822 includes RAM and ROM, and stores a program executed by the controller 821 and various types of control data (for example, terminal list, transmission power data, and scheduling data)

The network interface 823 is a communication interface for connecting the base station device 820 to a core network 824. The controller 821 may communicate with a core network node or other gNBs via the network interface 823. In that case, the gNB 800 may be connected to the core network node or other gNBs to each other by a logical interface (for example, an S1 interface or an X2 interface). The network interface 823 may be a wired communication interface or a radio communication interface for a radio backhaul. When the network interface 823 is a radio communication interface, the network interface 823 may use a frequency band higher than the frequency band used by the radio communication interface 825, for radio communication.

The radio communication interface 825 supports a cellular communication scheme such as NR, LTE, or LTE-Advanced, and provides a radio connection to terminals located in cells of gNB 800 via the antenna 810. The radio communication interface 825 can typically include a baseband (BB) processor 826, RF circuit 827, or the like. The BB processor 826 may perform, for example, encoding/decoding, modulation/demodulation, and multiplexing/demultiplexing, and executes various types of signal processing in individual layers (for example, L1, Medium Access Control (MAC), Radio Link Control (RLC), and Packet Data Convergence Protocol (PDCP)). The BB processor 826 may include some or all of the above-described logical functions instead of the controller 821. The BB processor 826 may be a module including: memory for storing a communication control program; a processor for executing the program; and related circuits. The functions of the BB processor 826 may be modified by updating the above program. Furthermore, the module may be a card or a blade inserted into a slot of the base station device 820, or may be a chip mounted on the card or the blade. The RF circuit 827 may include a mixer, a filter, an amplifier, or the like, and transmits and receives radio signals via the antenna 810.

The radio communication interface 825 may include a plurality of BB processors 826 as illustrated in FIG. 18, and the plurality of BB processors 826 may each correspond to a plurality of frequency bands used by the gNB 800, for example. Furthermore, the radio communication interface 825 may include a plurality of RF circuits 827 as illustrated in FIG. 18, and the plurality of RF circuits 827 may each correspond to a plurality of antenna elements, for example. Although FIG. 18 illustrates an example in which the radio communication interface 825 includes a plurality of BB processors 826 and a plurality of RF circuits 827, the radio communication interface 825 may include a single BB processor 826 or a single RF circuit 827.

In the gNB 800 illustrated in FIG. 18, one or more components included in the control unit 140 described with reference to FIG. 10 may be implemented in the radio communication interface 825. Alternatively, at least some of these components may be implemented in the controller 821. As an example, the gNB 800 may be equipped with a module including a part or all of the radio communication interface 825 (for example, the BB processor 826) and/or the controller 821, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the gNB 800, and the radio communication interface 825 (for example, the BB processor 826) and/or the controller 821 may execute the program. As described above, the eNB 800, the base station device 820, or the above module may be provided as a device including the one or more components, and a program for causing the processor to function as the one or more components may be provided. Furthermore, a readable recording medium on which the above program is recorded may be provided.

Furthermore, in the gNB 800 illustrated in FIG. 18, the communication unit 120 described with reference to FIG. 10 may be implemented in the radio communication interface 825 (for example, the RF circuit 827). Furthermore, the antenna unit 110 may be implemented in the antenna 810. Furthermore, the storage unit 130 may be implemented in the memory 822.

Second Application Example

Figure 19:
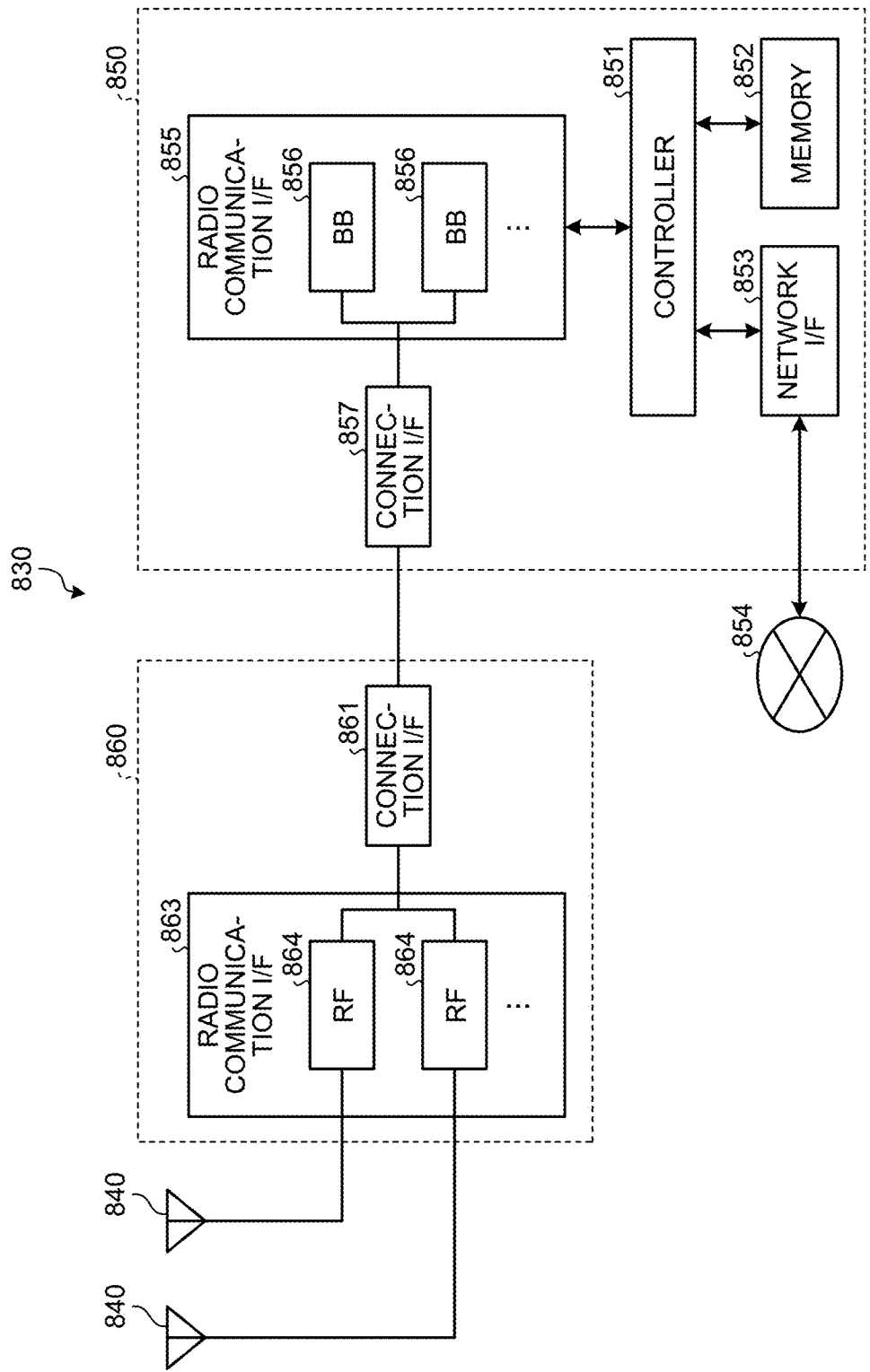
FIG. 19 is a block diagram illustrating a second example of a schematic configuration of a gNB to which the technology according to the present disclosure is applicable.

FIG. 19 is a block diagram illustrating a second example of a schematic configuration of a gNB to which the technology according to the present disclosure is applicable. A gNB 830 has one or more antennas 840, a base station device 850, and a gNB-DU 860. Each of the antennas 840 and the gNB-DU 860 may be connected to each other via an RF cable. Furthermore, the base station device 850 and the gNB-DU 860 can be connected to each other by a high-speed line such as an optical fiber cable. Incidentally, in a case where the technology of the present disclosure will be applied to eNB instead of gNB, the gNB-DU 860 will be replaced with RRH.

Each of the antennas 840 has a single or a plurality of antenna elements (for example, a plurality of antenna elements constituting a MIMO antenna) and is used for transmission and reception of radio signals by the gNB-DU 860. The gNB 830 has a plurality of antennas 840 as illustrated in FIG. 19, and the plurality of antennas 840 may each correspond to a plurality of frequency bands used by the gNB 830, for example. Although FIG. 19 illustrates an example in which the gNB 830 has the plurality of antennas 840, the gNB 830 may have a single antenna 840.

The base station device 850 includes a controller 851, a memory 852, a network interface 853, a radio communication interface 855, and a connection interface 857. The controller 851, the memory 852, and the network interface 853 are similar to the controller 821, memory 822, and network interface 823 described with reference to FIG. 20, respectively.

The radio communication interface 855 supports a cellular communication scheme such as NR, LTE, or LTE-Advanced, and provides a radio connection to terminals located in the sector corresponding to the gNB-DU 860 via the gNB-DU 860 and the antenna 840. The radio communication interface 855 can typically include a BB processor 856 or the like. The BB processor 856 is similar to the BB processor 826 described with reference to FIG. 18, except that connection to an RF circuit 864 of the gNB-DU 860 is made via the connection interface 857. The radio communication interface 855 may include a plurality of BB processors 856 as illustrated in FIG. 19, and the plurality of BB processors 856 may each correspond to a plurality of frequency bands used by the gNB 830, for example. Although FIG. 19 illustrates an example in which the radio communication interface 855 includes a plurality of BB processors 856, the radio communication interface 855 may include a single BB processor 856.

The connection interface 857 is an interface for connecting the base station device 850 (radio communication interface 855) to the gNB-DU 860. The connection interface 857 may be a communication module for communication over the high-speed line connecting the base station device 850 (radio communication interface 855) and the gNB-DU 860.

The gNB-DU 860 also includes a connection interface 861 and a radio communication interface 863.

The connection interface 861 is an interface for connecting the gNB-DU 860 (radio communication interface 863) to the base station device 850. The connection interface 861 may be a communication module for communication over the high-speed line.

The radio communication interface 863 transmits and receives radio signals via the antenna 840. The radio communication interface 863 can typically include the RF circuit 864 or the like. The RF circuit 864 may include a mixer, a filter, an amplifier, or the like, and transmits and receives radio signals via the antenna 840. The radio communication interface 863 includes a plurality of RF circuits 864 as illustrated in FIG. 19, and the plurality of RF circuits 864 may each correspond to a plurality of antenna elements, for example. Although FIG. 19 illustrates an example in which the radio communication interface 863 includes a plurality of RF circuits 864, the radio communication interface 863 may include a single RF circuit 864.

In the gNB 830 illustrated in FIG. 19, one or more components included in the control unit 140 described with reference to FIG. 10 may be implemented in the radio communication interface 855 and/or the radio communication interface 863. Alternatively, at least some of these components may be implemented in the controller 851. As an example, the gNB 830 may be equipped with a module including a part or all of the radio communication interface 855 (for example, the BB processor 856) and/or the controller 851, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the gNB 830, and the radio communication interface 855 (for example, the BB processor 856) and/or the controller 851 may execute the program. As described above, the gNB 830, the base station device 850, or the above module may be provided as a device including the one or more components, and a program for causing the processor to function as the one or more components may be provided. Furthermore, a readable recording medium on which the above program is recorded may be provided.

Furthermore, in the gNB 830 illustrated in FIG. 19, the communication unit 120 described with reference to FIG. 10, for example, may be implemented in the radio communication interface 863 (for example, the RF circuit 864). Furthermore, the antenna unit 110 may be implemented in the antenna 840. Furthermore, the storage unit 130 may be implemented in the memory 852.

4.2. Application Examples Related to Terminal Devices

First Application Example

Figure 20:
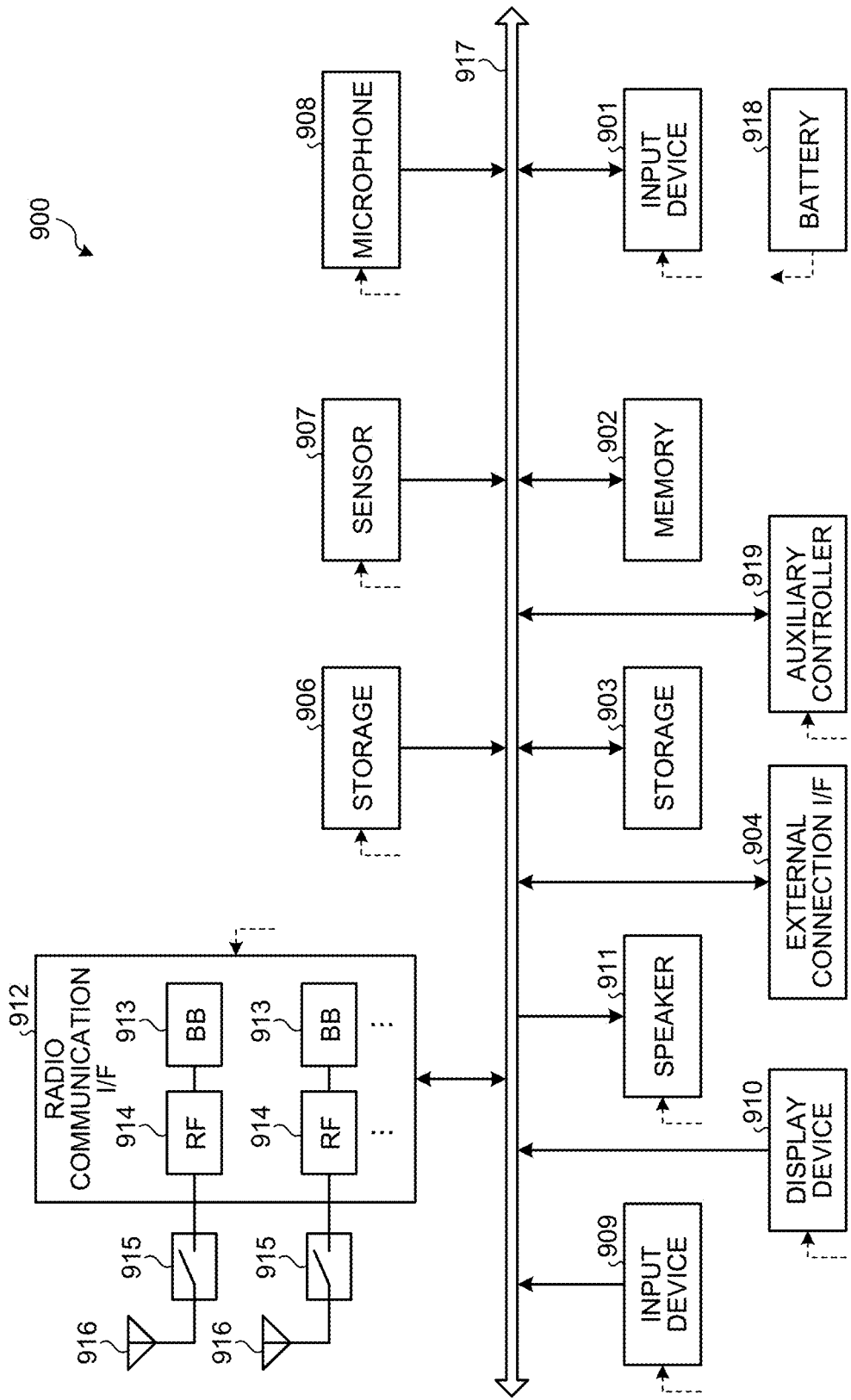
FIG. 20 is a block diagram illustrating an example of a schematic configuration of a smartphone to which the technology according to the present disclosure is applicable.

FIG. 20 is a block diagram illustrating an example of a schematic configuration of a smartphone 900 to which the technology according to the present disclosure is applicable. The smartphone 900 includes a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or a System on Chip (SoC), for example, and controls the functions of the application layer and other layers of the smartphone 900. The memory 902 includes RAM and ROM and stores programs to be executed by the processor 901, and data. The storage 903 may include a storage medium such as semiconductor memory or a hard disk. The external connection interface 904 is an interface for connecting an external device such as a memory card or a Universal Serial Bus (USB) device to the smartphone 900.

The camera 906 includes an imaging element such as a Charge Coupled Device (CCD) or a Complementary Metal Oxide Semiconductor (CMOS), and generates a captured image. Examples of the sensor 907 can include a group of sensors such as a positioning sensor, a gyro sensor, a geomagnetic sensor, and an acceleration sensor. The microphone 908 converts the voice input to the smartphone 900 into a voice signal. The input device 909 includes a touch sensor that detects a touch on the screen of the display device 910, a keypad, a keyboard, a button, or a switch and receives an input of operation or information from the user. The display device 910 has a screen such as a liquid crystal display (LCD) or an organic light emitting diode (OLED) display, and displays an output image of the smartphone 900. The speaker 911 converts the voice signal output from the smartphone 900 into voice.

The radio communication interface 912 supports a cellular communication scheme such as NR, LTE, or LTE-Advanced and executes radio communication. The radio communication interface 912 can typically include a BB processor 913, an RF circuit 914, or the like. The BB processor 913 may perform, for example, encoding/decoding, modulation/demodulation, and multiplexing/demultiplexing, and performs various signal processing for radio communication. The RF circuit 914 may include a mixer, a filter, an amplifier, or the like, and transmits and receives radio signals via the antenna 916. The radio communication interface 912 may be a one-chip module integrating the BB processor 913 and the RF circuit 914. The radio communication interface 912 may include a plurality of BB processors 913 and a plurality of RF circuits 914 as illustrated in FIG. 18. Although FIG. 18 illustrates an example in which the radio communication interface 912 includes a plurality of BB processors 913 and a plurality of RF circuits 914, the radio communication interface 912 may include a single BB processor 913 or a single RF circuit 914.

Furthermore, the radio communication interface 912 may support other types of radio communication scheme such as short-range radio communication scheme, near field radio communication scheme, or wireless Local Area Network (LAN) scheme in addition to the cellular communication scheme. In that case, the radio communication interface 912 may include the BB processor 913 and the RF circuit 914 for each of the radio communication schemes.

Each of the antenna switches 915 switches the connection destination of the antenna 916 between a plurality of circuits included in the radio communication interface 912 (for example, circuits for different radio communication schemes).

Each of the antennas 916 has a single or a plurality of antenna elements (for example, a plurality of antenna elements constituting a MIMO antenna) and is used for transmitting and receiving radio signals by the radio communication interface 912. The smartphone 900 may have a plurality of antennas 916 as illustrated in FIG. 20. Although FIG. 20 illustrates an example in which the smartphone 900 has the plurality of antennas 916, the smartphone 900 may have a single antenna 916.

Furthermore, the smartphone 900 may be provided with the antenna 916 for each of the radio communication schemes. In that case, the antenna switch 915 may be omitted from the configuration of the smartphone 900.

The bus 917 provides mutual connection between the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies power to individual blocks of the smartphone 900 illustrated in FIG. 20 via the power supply lines partially illustrated by the broken lines in the figure. The auxiliary controller 919 controls operation of minimum necessary functions of the smartphone 900 during a sleep mode, for example.

In the smartphone 900 illustrated in FIG. 20, one or more components included in the control unit 240 described with reference to FIG. 11 may be implemented in the radio communication interface 912. Alternatively, at least some of these components may be implemented in the processor 901 or the auxiliary controller 919. As an example, the smartphone 900 may be equipped with a module including a part (for example, the BB processor 913) or all of the radio communication interface 912, the processor 901, and/or the auxiliary controller 919, and may be equipped with one or more of the above-described components in the module. In this case, the module may store a program for causing the processor to function as the one or more components (in other words, a program for causing the processor to perform the operation of the one or more components) and may execute the program. As another example, the program causing the processor to function as the one or more of the above components may be installed in the smartphone 900, and the radio communication interface 912 (for example, the BB processor 913), the processor 901, and/or the auxiliary controller 919 may execute the program. As described above, the smartphone 900 or the above module may be provided as a device including the one or more components, and a program for causing the processor to function as the one or more components may be provided. Furthermore, a readable recording medium on which the above program is recorded may be provided.

Furthermore, in the smartphone 900 illustrated in FIG. 20, for example, the communication unit 220 described with reference to FIG. 11 may be implemented in the radio communication interface 912 (for example, the RF circuit 914). Furthermore, the antenna unit 210 may be implemented in the antenna 916. Furthermore, the storage unit 230 may be implemented in the memory 902.

Second Application Example

Figure 21:
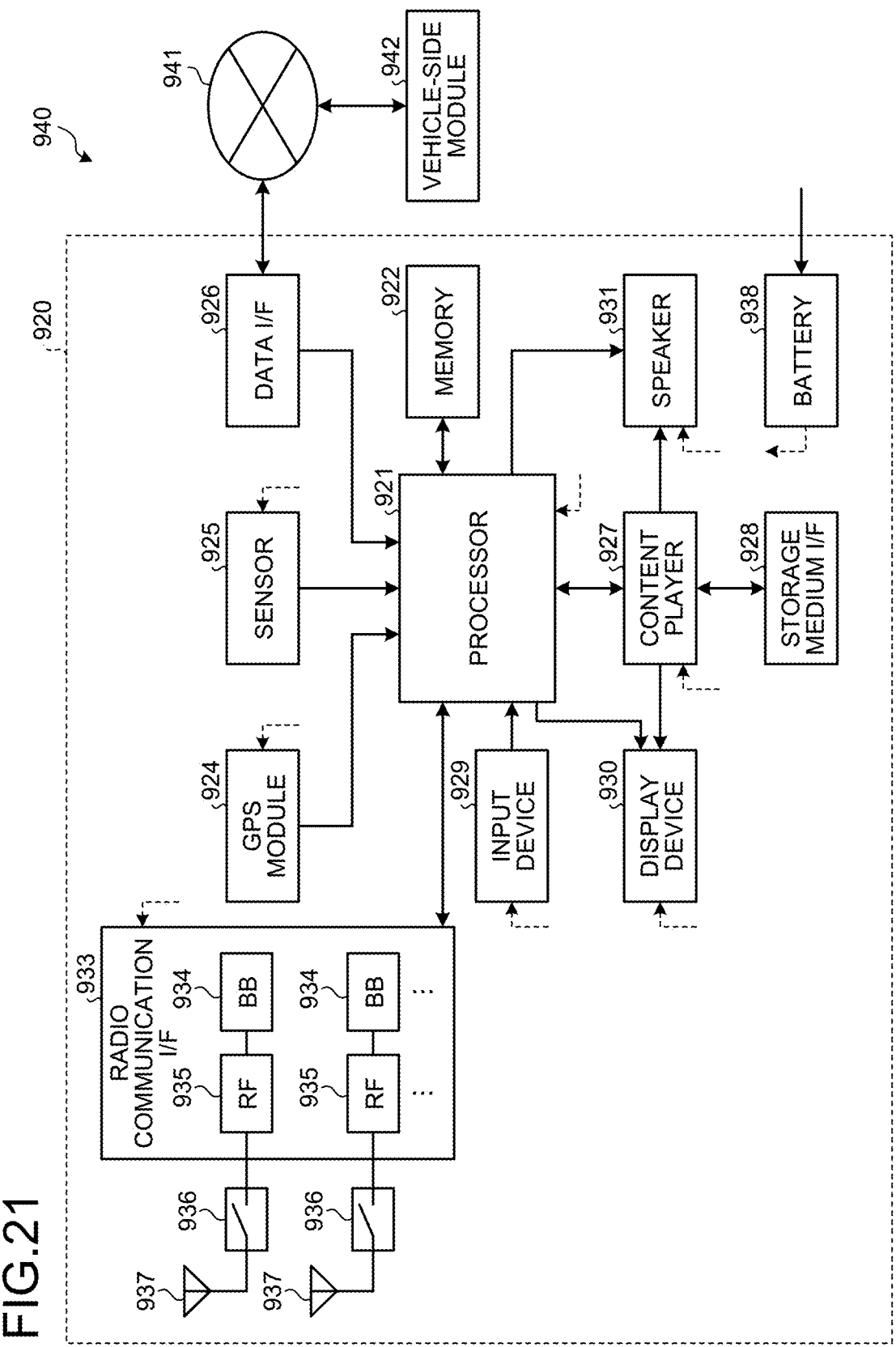
FIG. 21 is a block diagram illustrating an example of a schematic configuration of a car navigator to which the technology according to the present disclosure is applicable.

FIG. 21 is a block diagram illustrating an example of a schematic configuration of a car navigator 920 to which the technology according to the present disclosure is applicable. The car navigator 920 includes a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls the navigation function and other functions of the car navigator 920. The memory 922 includes RAM and ROM and stores programs to be executed by the processor 921, and data.

The GPS module 924 measures the position (including latitude, longitude, and altitude) of the car navigator 920 using GPS signals received from GPS satellites. The sensor 925 can include a group of sensors such as a gyro sensor, a geomagnetic sensor, and a barometric pressure sensor, for example. The data interface 926 is connected to an in-vehicle network 941 via a terminal (not illustrated), for example, and acquires data generated on the vehicle side such as vehicle speed data.

The content player 927 plays pieces of content stored on a storage medium (for example, a CD or DVD) inserted into the storage medium interface 928. The input device 929 includes a touch sensor that detects a touch on the screen of the display device 930, a button, or a switch and receives an input of operation or information from the user. The display device 930 includes a screen such as an LCD or OLED display and displays an image of a navigation function or a content to be played. The speaker 931 outputs the sound of the navigation function or the content to be played.

The radio communication interface 933 supports a cellular communication scheme such as NR, LTE, or LTE-Advanced and executes radio communication. The radio communication interface 933 can typically include a BB processor 934, an RF circuit 935, or the like. The BB processor 934 may perform, for example, encoding/decoding, modulation/demodulation, and multiplexing/demultiplexing, and performs various signal processing for radio communication. The RF circuit 935 may include a mixer, a filter, an amplifier, or the like, and transmits and receives radio signals via the antenna 937. The radio communication interface 933 may be a one-chip module integrating the BB processor 934 and the RF circuit 935. The radio communication interface 933 may include a plurality of BB processors 934 and a plurality of RF circuits 935 as illustrated in FIG. 21. Although FIG. 21 illustrates an example in which the radio communication interface 933 includes a plurality of BB processors 934 and a plurality of RF circuits 935, the radio communication interface 933 may include a single BB processor 934 or a single RF circuit 935.

Furthermore, the radio communication interface 933 may support other types of radio communication schemes such as short-range radio communication scheme, near field radio communication scheme, or a wireless LAN scheme in addition to the cellular communication scheme. In that case, the radio communication interface 933 may include the BB processor 934 and the RF circuit 935 for each of the radio communication schemes.

Each of the antenna switches 936 switches the connection destination of the antenna 937 between a plurality of circuits included in the radio communication interface 933 (for example, circuits for different radio communication schemes).

Each of the antennas 937 has a single or a plurality of antenna elements (for example, a plurality of antenna elements constituting a MIMO antenna) and is used for transmitting and receiving radio signals by the radio communication interface 933. The car navigator 920 may have a plurality of antennas 937 as illustrated in FIG. 21. Although FIG. 21 illustrates an example in which the car navigator 920 has a plurality of antennas 937, the car navigator 920 may have a single antenna 937.

Furthermore, the car navigator 920 may include the antenna 937 for each of the radio communication schemes. In that case, the antenna switch 936 may be omitted from the configuration of the car navigator 920.

The battery 938 supplies power to individual blocks of the car navigator 920 illustrated in FIG. 19 via the power supply lines partially illustrated by the broken lines in the figure. In addition, the battery 938 stores electric power supplied from the vehicle side.

In the car navigator 920 illustrated in FIG. 21, one or more components included in the control unit 240 described with reference to FIG. 11 may be implemented in the radio communication interface 933. Alternatively, at least some of these components may be implemented in the processor 921. As an example, the car navigator 920 may be equipped with a module including a part (for example, the BB processor 934) or all of the radio communication interface 933 and/or the processor 921, and the module may be equipped with one or more of the above components. In this case, the module may store a program for causing the processor to function as the one or more components (in other words, a program for causing the processor to perform the operation of the one or more components) and may execute the program. As another example, a program causing the processor to function as one or more of the above components may be installed in the car navigator 920, and the radio communication interface 933 (for example, the BB processor 934) and/or the processor 921 may execute the program. As described above, the car navigator 920 or the above module may be provided as a device including the one or more components, and a program for causing the processor to function as the one or more components may be provided. Furthermore, a readable recording medium on which the above program is recorded may be provided.

Furthermore, in the car navigator 920 illustrated in FIG. 21, the communication unit 220 described with reference to FIG. 11, for example, may be implemented in the radio communication interface 933 (for example, the RF circuit 935). Furthermore, the antenna unit 210 may be implemented in the antenna 937. Furthermore, the storage unit 230 may be implemented in the memory 922.

Furthermore, the technology according to the present disclosure may be actualized as an in-vehicle system (or vehicle) 940 including one or more blocks of the car navigator 920 described above, the in-vehicle network 941, and a vehicle-side module 942. The vehicle-side module 942 generates vehicle-side data such as vehicle speed, engine speed, or failure information, and outputs the generated data to the in-vehicle network 941.

5. Modifications

A control device that controls the base station device 100 or the terminal device 200 of the present embodiment may be actualized by a dedicated computer system or a general-purpose computer system.

For example, a communication program for executing the above-described operations (for example, a transmission/reception process) is stored in a computer-readable recording medium such as an optical disk, semiconductor memory, a magnetic tape, or a flexible disk and distributed. For example, the program is installed on a computer and the above processes are executed to achieve the configuration of the control device. At this time, the control device may be a base station device or a device external to the terminal device (for example, a personal computer). Furthermore, the control device may be a base station device or a device inside the terminal device.

Furthermore, the communication program may be stored in a disk device included in a server device on a network such as the Internet so as to be downloadable to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloadable to a computer, for example.

Furthermore, among individual processes described in the above embodiments, all or a part of the processes described as being performed automatically may be manually performed, or the processes described as being performed manually can be performed automatically by known methods. In addition, the processing procedures, specific names, and information including various data and parameters illustrated in the above documents or drawings can be arbitrarily changed unless otherwise specified. For example, various types of information illustrated in each of drawings are not limited to the information illustrated.

In addition, each of components of each of devices illustrated is provided as a functional and conceptional illustration and thus does not necessarily need to be physically configured as illustrated. That is, the specific form of distribution/integration of each of devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes. Furthermore, the order of individual steps illustrated in the flowchart and the sequence diagram in the embodiment can be changed as appropriate.

Although in the above-described embodiment, defaults of combinations of the receiving antenna panel and the receiving beam (reception environment) to be used by the terminal device 200 have been described, the "receiving antenna panel" does not have to be explicitly considered in one aspect. As an example, when one receiving beam has been received and measured by a plurality of different receiving antenna panels, it may be recognized (considered) as a plurality of different receiving beams from the viewpoint (UE perspective) of the UE (terminal device 200). In this case, the above-described "defaults of the combinations (reception environment) of the receiving antenna panel and the receiving beam to be used by the terminal device 200" may be replaced with "the defaults of the receiving beam to be used by the terminal device 200". Moreover, the antenna panel in the above embodiment (including modifications, application examples, and examples of application) may correspond to a combination of one or a plurality of antenna ports. In addition to or in place of this, the antenna panel in the above embodiment (including modifications, application examples, and examples of application) may correspond to an antenna port group including one or more antenna ports. In addition to or instead of this, the antenna panel in the above embodiments may correspond to a combination of one or more antenna ports (or an antenna port group) and Quasi-co-location parameters.

In addition to or instead of this, the association between the resource area of the control information (e.g. PDCCH) and the identification information (e.g. SSB-Index) (or the combination of the receiving antenna panel and the receiving beam) described above may be set for per the terminal device 200 (UE), MAC entity in the UE, cell, CC, or BWP.

The resource area or resource set in the above-described embodiment may be one or more of a Resource Element Group (REG) constituted with one Resource Block and one OFDM symbol, for example. Alternatively, the resource area or the resource set may be a Control Channel Element (CCE) constituted with a plurality of (e.g. six) REGs. Further alternatively, the resource area or the resource set may be a Control-resource set (CORESET) constituted with a plurality of Resource Blocks and one to three OFDM symbols. At least one of the parameters and L values illustrated in Table 2 below constituting CORESET may be transmitted from NGRAN (base station 100) to the UE (terminal device 200) by RRC signaling (e.g. RRC Reconfiguration message). The RRC Reconfiguration message here may also include a MeasConfig (measurement setting) for measuring the reference signal (e.g. SSB) described above.

TABLE 2

| Parameter |
|---|
| $N_{RB}^{CORESET}$ |
| $N_{symb}^{CORESET}$ |
| $N_{REG}^{CORESET}$ |

6. Summary

As described above, according to one embodiment of the present disclosure, the communication device (for example, the terminal device 200) according to the present embodiment includes the acquisition unit 242 and the reception unit 243. The acquisition unit 242 acquires similarity information indicating the similarity of the beam characteristics of the transmitting antenna panel in a plurality of signal groups transmitted from the base station 100. The reception unit 243 selects and receives a signal group to be received from among a plurality of signal groups based on the similarity information acquired by the acquisition unit 242.

With this configuration, for example, the terminal device 200 performs a beam determination process and a reporting process of the determined beam to the base station 100 only for one received resource set, and does not have to perform the determination process or reporting process for the other resource sets. Therefore, the terminal device 200 according to the embodiment can reduce unnecessary signal processing.

Furthermore, the reception unit 243 of the communication device according to the embodiment omits reception processes of signal groups other than the selected signal group.

With this configuration, for example, the terminal device 200 performs a beam determination process and a reporting process of the determined beam to the base station 100 just for one received resource set, and does not have to perform the determination process or reporting process for the other resource sets. Therefore, the terminal device 200 according to the embodiment can reduce unnecessary signal processing.

Furthermore, the acquisition unit 242 of the communication device according to the embodiment acquires the receiving panel information that designates the antenna panel to receive the signal group from the base station 100. The reception unit 243 receives the signal group on the antenna panel designated by the receiving panel information acquired by the acquisition unit 242.

This makes it possible to designate the antenna panel and the beam separately from each other, enabling the use of the setting method suitable for the switching time of the antenna panel and the switching time of the beam.

In addition, the communication device according to the embodiment includes the transmission unit 244. The transmission unit 244 transmits a predetermined signal group to the base station 100. The acquisition unit 242 acquires transmitting panel information that designates an antenna panel that transmits a signal group from the base station 100. The transmission unit 244 transmits a signal group by using the antenna panel designated by the transmitting panel information acquired by the acquisition unit 242.

With this configuration, the terminal device 200 can have the transmitting antenna panel be designated from the base station 100, making it possible to clarify which transmitting antenna panel should be used.

Furthermore, the transmission unit 244 of the communication device according to the embodiment transmits the signal group to the base station 100 by using the antenna panel that has received the signal group transmitted from the base station 100.

With this configuration, the base station 100 can allow the terminal device 200 to freely select the beam after implicitly designating the transmitting antenna panel of the terminal device 200.

In addition, the communication device according to the embodiment includes the notification unit 241. The notification unit 241 notifies the base station 100 of the capability information indicating that it is possible to selectively receive the signal group based on similarity information.

With this configuration, the base station 100 can take measures such as not transmitting similarity information to the terminal device 200 that cannot selectively receive the resource set, leading to the reduction of the processing load.

Furthermore, the notification unit 241 of the communication device according to the embodiment notifies the base station 100 of the characteristic information regarding the beam characteristics of the antenna panel that receives the signal group.

This makes it easy for the base station 100 to designate the antenna panel of the terminal device 200.

Furthermore, the base station device 100 according to the embodiment includes the generation unit 142 and the transmission unit 143. The generation unit 142 generates similarity information indicating the similarity of the transmission environment characteristics in the plurality of signal groups to be transmitted to the terminal device 200. The transmission unit 143 transmits the similarity information generated by the generation unit 142 to the terminal device 200.

With this configuration, for example, the terminal device 200 performs a beam determination process and a reporting process of the determined beam to the base station 100 only for one received resource set, and does not have to perform the determination process or reporting process for the other resource sets. Therefore, the terminal device 200 according to the embodiment can reduce unnecessary signal processing.

In addition, the base station device 100 according to the embodiment includes the acquisition unit 141. The acquisition unit 141 acquires capability information indicating that it is possible to selectively receive a signal group from the terminal device 200. The transmission unit 143 transmits similarity information to the terminal device 200 when the terminal device 200 is capable of selectively receiving the signal group based on the capability information.

With this configuration, the base station 100 can take measures such as not transmitting similarity information to the terminal device 200 that cannot selectively receive the resource set, leading to the reduction of the processing load.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technology can also have the following configurations.

(1)

A communication device comprising:

an acquisition unit that acquires similarity information indicating similarity of beam characteristics of a transmitting antenna panel in a plurality of signal groups transmitted from a base station; and a reception unit that selects and receives the signal group to be received, from among the plurality of signal groups, based on the similarity information acquired by the acquisition unit.

(2)

The communication device according to (1), wherein the reception unit omits reception processes of signal groups other than the selected signal group.

(3)
The communication device according to any one of (1) to (2),
wherein the acquisition unit acquires receiving panel information that designates an antenna panel that receives the signal group from the base station, and
the reception unit receives the signal group by the antenna panel designated by the receiving panel information acquired by the acquisition unit.

(4)
The communication device according to any one of (1) to (3), further comprising
a transmission unit that transmits a predetermined signal group to the base station,
wherein the acquisition unit acquires transmitting panel information that designates an antenna panel that transmits the signal group from the base station, and
the transmission unit transmits the signal group by the antenna panel designated by the transmitting panel information acquired by the acquisition unit.

(5)
The communication device according to (4),
wherein the transmission unit transmits the signal group to the base station by using the antenna panel that has received the signal group transmitted from the base station.

(6)
The communication device according to any one of (1) to (5), further comprising
a notification unit that preliminarily notifies the base station of capability information indicating that it is possible to selectively receive the signal group based on the similarity information.

(7)
The communication device according to (6),
wherein the notification unit preliminarily notifies the base station of characteristic information regarding beam characteristics of an antenna panel that receives the signal group.

(8)
A base station device comprising:
a generation unit that generates similarity information indicating similarity of the characteristics of a transmission environment in a plurality of signal groups to be transmitted to a communication device; and
a transmission unit that transmits the similarity information generated by the generation unit to the communication device.

(9)
The base station device according to (8), further comprising
an acquisition unit that acquires capability information indicating that it is possible to selectively receive the signal group from the communication device,
wherein the transmission unit transmits the similarity information to the communication device in a case where the communication device is capable of selectively receiving the signal group based on the capability information.

(10)
A communication method comprising:
an acquisition step of acquiring similarity information indicating similarity of beam characteristics of a transmitting antenna panel in a plurality of signal groups transmitted from a base station; and
a reception step of selectively receiving the signal group to be received, from among the plurality of signal groups, based on the similarity information acquired by the acquisition step.

(11)
A base station device control method comprising:
a generation step of generating similarity information indicating similarity of beam characteristics of a transmitting antenna panel in a plurality of signal groups to be transmitted to a communication device; and
a transmission step of transmitting the similarity information generated by the generation step to the communication device.

REFERENCE SIGNS LIST

1 COMMUNICATION SYSTEM
100 BASE STATION DEVICE (BASE STATION)
200 TERMINAL DEVICE

The invention claimed is:

1. A communication device configured to sequentially process a first set of reference signals and a second set of reference signals that are sequentially transmitted to the communication device from a base station via beam sweeping from a first antenna panel and a second antenna panel, different from the first antenna panel, respectively, the communication device comprising:
a transceiver; and
control circuitry configured to:
send a notice to the base station that informs the base station that the communication device is capable of processing the first set of references signals and ignoring the second set of reference signals based on similarity information about beams transmitted via the first and second antenna panels;
based on the notice, acquire the similarity information from the base station;
monitor for the first set of references signals;
upon receiving the first set of references signals, sending a first report to the base station, the first report indicating a first resource ID and a first reception power level of at least one reference signal in the first set of reference signals; and
based on the similarity information indicating the beams transmitted via the first and second antenna panels are facing in a similar direction:
omit monitoring the second set of references signals and not sending a second report to the base station that indicates a second resource ID and a second reception power level of at least one reference signal in the second set of reference signals; and
receive a data signal that is transmitted from the base station via one of the first and second antenna panels based on at least the first report.

2. The communication device according to claim 1, wherein the control circuitry is further configured to:
based on the similarity information indicating the beams transmitted via the first and second antenna panels are not facing in a similar direction:
monitor the second set of references signals;
upon receiving the second set of references signals, sending the second report to the base station indicating the second resource ID and the second reception power level of at least one reference signal in the second set of reference signals; and
receive a data signal that is transmitted from the base station via an antenna panel of the first and second antenna panels corresponding to a highest reported reference signal reception power level among the reported first and second reception power levels.

3. The communication device according to claim 1, wherein the control circuitry is configured to receive the data signal from the base station via the first antenna panel.

4. The communication device according to claim 1, wherein the control circuitry is configured to receive the data signal from the base station via the second antenna panel.

5. A base station device configured to sequentially transmit a first set of reference signals and a second set of reference signals to a user equipment via beam sweeping from a first antenna panel and a second antenna panel, different from the first antenna panel, respectively, the base station comprising:
  a transceiver; and
  control circuitry configured to:
    receive a notification from the user equipment indicating that the user equipment is capable of processing the first set of references signals and ignoring the second set of reference signals based on similarity information about beams transmitted via the first and second antenna panels;
    based on the notification, transmit the similarity information to the user equipment;
    transmit the first set of references signals to the user equipment;
    receive a first report from the user equipment, the first report indicating a first resource ID and a first reception power level of at least one reference signal in the first set of reference signals;
    transmit the second set of references signals to the user equipment; and
    based on the similarity information indicating the beams transmitted via the first and second antenna panels are facing in a similar direction:
      not receive a second report from the user equipment, the second report informing the base station of a second resource ID and a second reception power level of at least one reference signal in the second set of reference signals; and
      transmit a data signal to the user equipment via one of the first and second antenna panels selected by the base station based on at least on the first report.

6. The base station device according to claim 5, wherein the control circuitry is further configured to:
  based on the similarity information indicating the beams transmitted via the first and second antenna panels are not facing in a similar direction, receive the second report from the user equipment, the second report informing the base station of the second resource ID and the second reception power level of at least one reference signal in the second set of reference signal; and
  transmit a data signal to the user equipment via an antenna panel of the first and second antenna panels corresponding to a highest reported reference signal reception power level among the reported first and second reception power levels.

7. A communication method performed by a communication device configured to sequentially process a first set of reference signals and a second set of reference signals that are sequentially transmitted to the communication device from a base station via beam sweeping from a first antenna panel and a second antenna panel, different from the first antenna panel, the method comprising:
  sending a notice to the base station that informs the base station that the communication device is capable of processing the first set of references signals and ignoring the second set of reference signals based on similarity information about beams transmitted via the first and second antenna panels;
  based on the notice, acquiring the similarity information from the base station;
  monitoring for the first set of references signals;
  upon receiving the first set of references signals, sending a first report to the base station, the first report indicating a first resource ID and a first reception power level of at least one reference signal in the first set of reference signals; and
  based on the similarity information indicating the beams transmitted via the first and second antenna panels are facing in a similar direction:
    omitting monitoring of the second set of references signals and not sending a second report to the base station that indicates a second resource ID and a second reception power level of at least one reference signal in the second set of reference signals; and
    receiving a data signal that is transmitted from the base station via one of the first and second antenna panels selected by the base station based on at least the first report.

8. A method performed by a base station device control configured to sequentially transmit a first set of reference signals and a second set of reference signals to a user equipment via beam sweeping from a first antenna panel and a second antenna panel, different from the first antenna panel, respectively, the method comprising:
  receiving a notification from the user equipment indicating that the user equipment is capable of processing the first set of references signals and ignoring the second set of reference signals based on similarity information about beams transmitted via the first and second antenna panels,
  based on the notification, transmitting the similarity information to the user equipment;
  transmitting the first set of references signals to the user equipment;
  receiving a first report from the user equipment, the first report indicating a first resource ID and a first reception power level of at least one reference signal in the first set of reference signals;
  transmitting the second set of references signals to the user equipment;
  based on the similarity information indicating the beams transmitted via the first and second antenna panels are facing in a similar direction:
    not receiving a second report from the user equipment, the second report informing the base station of a second resource ID and a second reception power level of at least one reference signal in the second set of reference signals; and
    transmitting a data signal to the user equipment via one of the first and second antenna panels selected by the base station based on at least on the first report.

* * * * *